US009043250B2

(12) United States Patent
Ling et al.

(10) Patent No.: US 9,043,250 B2
(45) Date of Patent: May 26, 2015

(54) PRIVACY-PRESERVING AGGREGATED DATA MINING

(71) Applicant: Telcordia Technologies, Inc., Piscataway, NJ (US)

(72) Inventors: Yibei Ling, Belle Mead, NJ (US); Giovanni DiCrescenzo, Madison, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 192 days.

(21) Appl. No.: 13/738,592

(22) Filed: Jan. 10, 2013

(65) Prior Publication Data

US 2014/0040172 A1 Feb. 6, 2014

Related U.S. Application Data

(60) Provisional application No. 61/585,179, filed on Jan. 10, 2012.

(51) Int. Cl.

| | |
|---|---|
| ***G06F 15/18*** | (2006.01) |
| ***G06F 7/00*** | (2006.01) |
| ***G06F 7/04*** | (2006.01) |
| ***G06N 5/02*** | (2006.01) |
| ***G06N 99/00*** | (2010.01) |
| ***G06F 21/62*** | (2013.01) |

(52) U.S. Cl.
CPC .............. *G06N 5/022* (2013.01); *G06N 99/005* (2013.01); *G06F 21/6254* (2013.01)

(58) Field of Classification Search
None
See application file for complete search history.

(56) References Cited

U.S. PATENT DOCUMENTS

| | | | | |
|---|---|---|---|---|
| 2003/0028469 | A1 * | 2/2003 | Bergman et al. | 705/37 |
| 2013/0014270 | A1 * | 1/2013 | Sy et al. | 726/26 |

OTHER PUBLICATIONS

On Addressing Efficiency Concerns in Privacy-Preserving Mining, Agrawal et al., 2004, LNCS 297, pp. 113-124.*
Limiting Privacy Breaches in Privacy Preserving Data Mining, Evfimievski et al., Jun. 9-12, 2003, PODS 2003, pp. 211-222.*

* cited by examiner

*Primary Examiner* — Alan Chen

(57) ABSTRACT

An apparatus, system and method are introduced for preserving privacy of data in a dataset in a database with a number n of entries. In one embodiment, the apparatus includes memory including computer program code configured to, with a processor, cause the apparatus to form a random matrix of dimension m by n, wherein m is less than n, operate on the dataset with the random matrix to produce a compressed dataset, form a pseudoinverse of the random matrix, and operate on the dataset with the pseudoinverse of the random matrix to produce a decompressed dataset.

20 Claims, 12 Drawing Sheets

FIG. 8

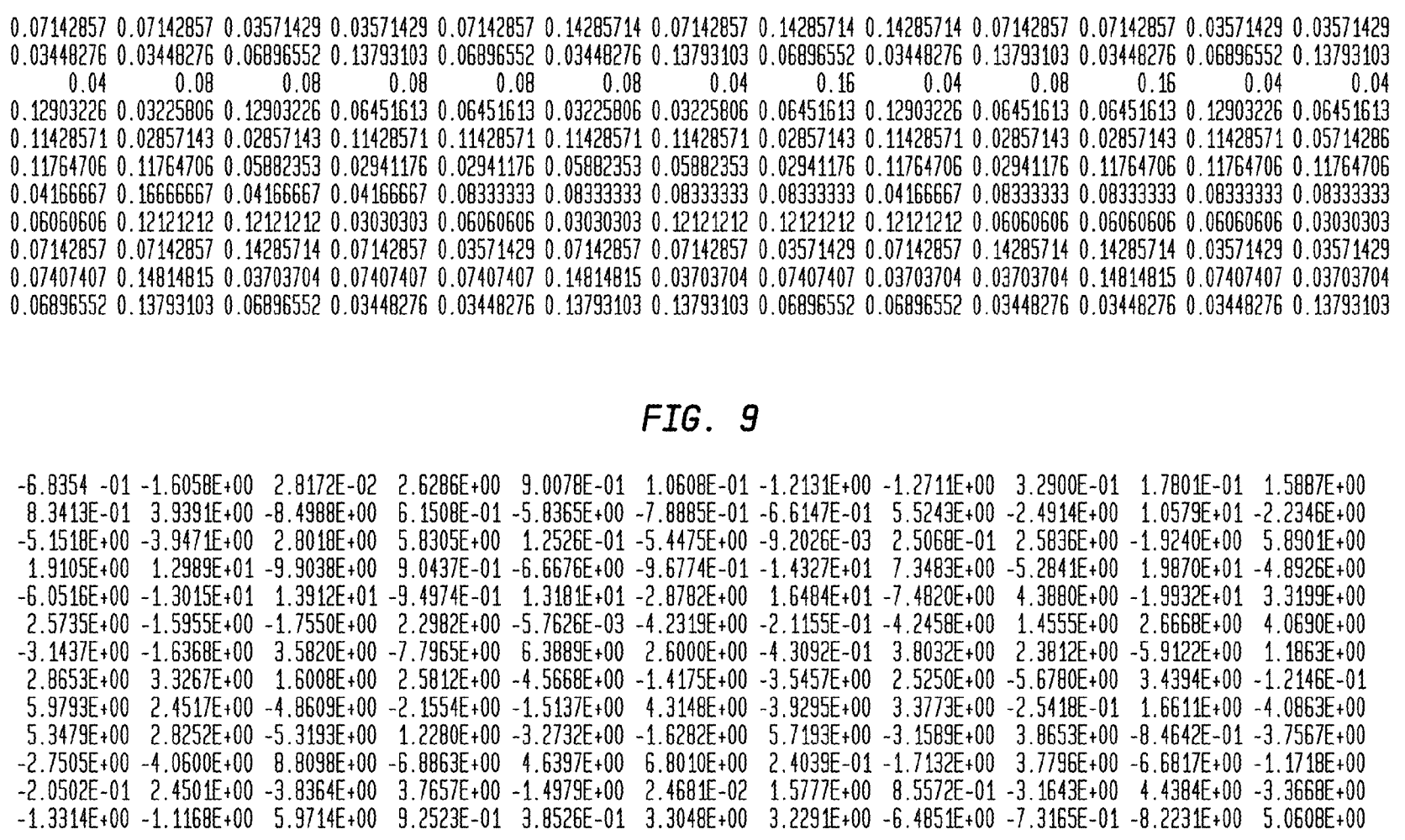

| | | | | | | | | | | | | |
|---|---|---|---|---|---|---|---|---|---|---|---|---|
| 0.07142857 | 0.07142857 | 0.03571429 | 0.03571429 | 0.07142857 | 0.14285714 | 0.07142857 | 0.14285714 | 0.14285714 | 0.07142857 | 0.07142857 | 0.03571429 | 0.03571429 |
| 0.03448276 | 0.03448276 | 0.06896552 | 0.13793103 | 0.06896552 | 0.03448276 | 0.13793103 | 0.06896552 | 0.03448276 | 0.13793103 | 0.03448276 | 0.06896552 | 0.13793103 |
| 0.04 | 0.08 | 0.08 | 0.08 | 0.08 | 0.08 | 0.04 | 0.16 | 0.04 | 0.08 | 0.16 | 0.04 | 0.04 |
| 0.12903226 | 0.03225806 | 0.12903226 | 0.06451613 | 0.06451613 | 0.03225806 | 0.03225806 | 0.06451613 | 0.12903226 | 0.06451613 | 0.06451613 | 0.12903226 | 0.06451613 |
| 0.11428571 | 0.02857143 | 0.02857143 | 0.11428571 | 0.11428571 | 0.11428571 | 0.11428571 | 0.02857143 | 0.11428571 | 0.02857143 | 0.02857143 | 0.11428571 | 0.05714286 |
| 0.11764706 | 0.11764706 | 0.05882353 | 0.02941176 | 0.02941176 | 0.05882353 | 0.05882353 | 0.02941176 | 0.11764706 | 0.02941176 | 0.11764706 | 0.11764706 | 0.11764706 |
| 0.04166667 | 0.16666667 | 0.04166667 | 0.04166667 | 0.08333333 | 0.08333333 | 0.08333333 | 0.08333333 | 0.04166667 | 0.08333333 | 0.08333333 | 0.08333333 | 0.08333333 |
| 0.06060606 | 0.12121212 | 0.12121212 | 0.03030303 | 0.06060606 | 0.03030303 | 0.12121212 | 0.12121212 | 0.12121212 | 0.06060606 | 0.06060606 | 0.06060606 | 0.03030303 |
| 0.07142857 | 0.07142857 | 0.14285714 | 0.07142857 | 0.03571429 | 0.07142857 | 0.07142857 | 0.03571429 | 0.07142857 | 0.14285714 | 0.14285714 | 0.03571429 | 0.03571429 |
| 0.07407407 | 0.14814815 | 0.03703704 | 0.07407407 | 0.07407407 | 0.14814815 | 0.03703704 | 0.07407407 | 0.03703704 | 0.03703704 | 0.14814815 | 0.07407407 | 0.03703704 |
| 0.06896552 | 0.13793103 | 0.06896552 | 0.03448276 | 0.03448276 | 0.13793103 | 0.13793103 | 0.06896552 | 0.06896552 | 0.03448276 | 0.03448276 | 0.03448276 | 0.13793103 |

FIG. 9

| | | | | | | | | | | |
|---|---|---|---|---|---|---|---|---|---|---|
| -6.8354 -01 | -1.6058E+00 | 2.8172E-02 | 2.6286E+00 | 9.0078E-01 | 1.0608E-01 | -1.2131E+00 | -1.2711E+00 | 3.2900E-01 | 1.7801E-01 | 1.5887E+00 |
| 8.3413E-01 | 3.9391E+00 | -8.4988E+00 | 6.1508E-01 | -5.8365E+00 | -7.8885E-01 | -6.6147E-01 | 5.5243E+00 | -2.4914E+00 | 1.0579E+01 | -2.2346E+00 |
| -5.1518E+00 | -3.9471E+00 | 2.8018E+00 | 5.8305E+00 | 1.2526E-01 | -5.4475E+00 | -9.2026E-03 | 2.5068E-01 | 2.5836E+00 | -1.9240E+00 | 5.8901E+00 |
| 1.9105E+00 | 1.2989E+01 | -9.9038E+00 | 9.0437E-01 | -6.6676E+00 | -9.6774E-01 | -1.4327E+01 | 7.3483E+00 | -5.2841E+00 | 1.9870E+01 | -4.8926E+00 |
| -6.0516E+00 | -1.3015E+01 | 1.3912E+01 | -9.4974E-01 | 1.3181E+01 | -2.8782E+00 | 1.6484E+01 | -7.4820E+00 | 4.3880E+00 | -1.9932E+01 | 3.3199E+00 |
| 2.5735E+00 | -1.5955E+00 | -1.7550E+00 | 2.2982E+00 | -5.7626E-03 | -4.2319E+00 | -2.1155E-01 | -4.2458E+00 | 1.4555E+00 | 2.6668E+00 | 4.0690E+00 |
| -3.1437E+00 | -1.6368E+00 | 3.5820E+00 | -7.7965E+00 | 6.3889E+00 | 2.6000E+00 | -4.3092E-01 | 3.8032E+00 | 2.3812E+00 | -5.9122E+00 | 1.1863E+00 |
| 2.8653E+00 | 3.3267E+00 | 1.6008E+00 | 2.5812E+00 | -4.5668E+00 | -1.4175E+00 | -3.5457E+00 | 2.5250E+00 | -5.6780E+00 | 3.4394E+00 | -1.2146E-01 |
| 5.9793E+00 | 2.4517E+00 | -4.8609E+00 | -2.1554E+00 | -1.5137E+00 | 4.3148E+00 | -3.9295E+00 | 3.3773E+00 | -2.5418E-01 | 1.6611E+00 | -4.0863E+00 |
| 5.3479E+00 | 2.8252E+00 | -5.3193E+00 | 1.2280E+00 | -3.2732E+00 | -1.6282E+00 | 5.7193E+00 | -3.1589E+00 | 3.8653E+00 | -8.4642E-01 | -3.7567E+00 |
| -2.7505E+00 | -4.0600E+00 | 8.8098E+00 | -6.8863E+00 | 4.6397E+00 | 6.8010E+00 | 2.4039E-01 | -1.7132E+00 | 3.7796E+00 | -6.6817E+00 | -1.1718E+00 |
| -2.0502E-01 | 2.4501E+00 | -3.8364E+00 | 3.7657E+00 | -1.4979E+00 | 2.4681E-02 | 1.5777E+00 | 8.5572E-01 | -3.1643E+00 | 4.4384E+00 | -3.3668E+00 |
| -1.3314E+00 | -1.1168E+00 | 5.9714E+00 | 9.2523E-01 | 3.8526E-01 | 3.3048E+00 | 3.2291E+00 | -6.4851E+00 | -7.3165E-01 | -8.2231E+00 | 5.0608E+00 |

FIG. 10-2
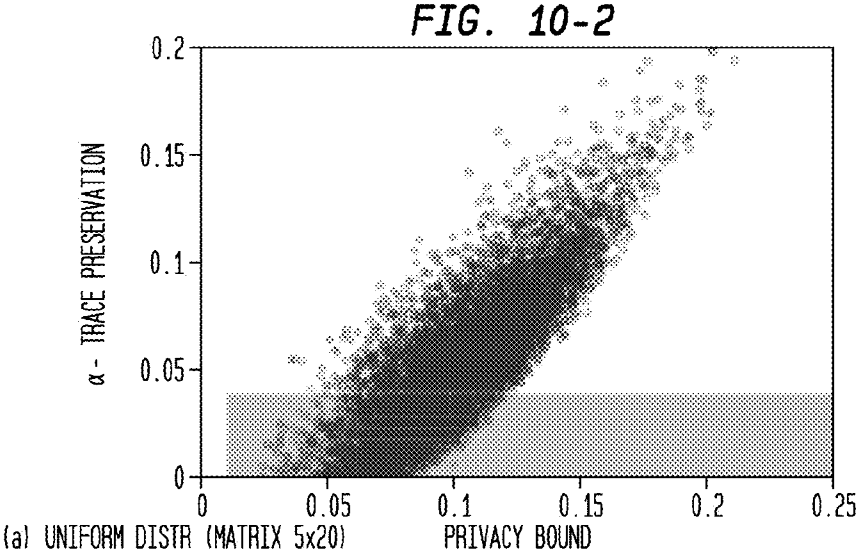
(a) UNIFORM DISTR (MATRIX 5x20) PRIVACY BOUND
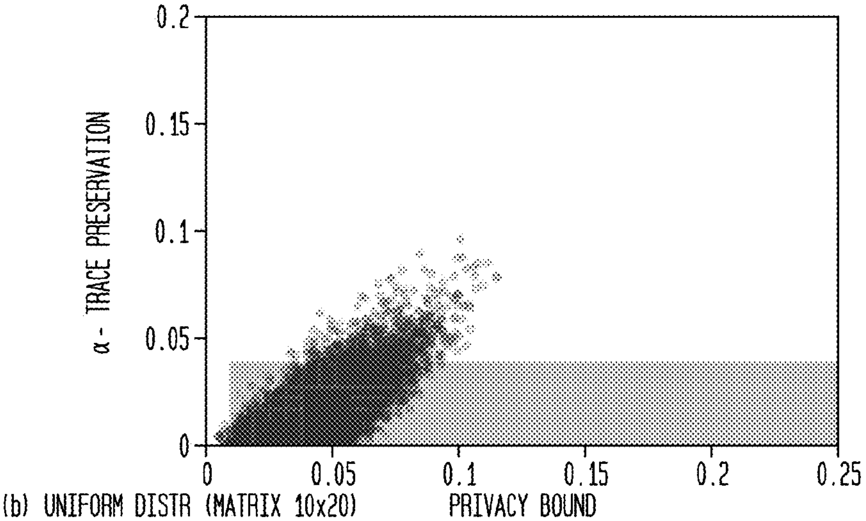
(b) UNIFORM DISTR (MATRIX 10x20) PRIVACY BOUND
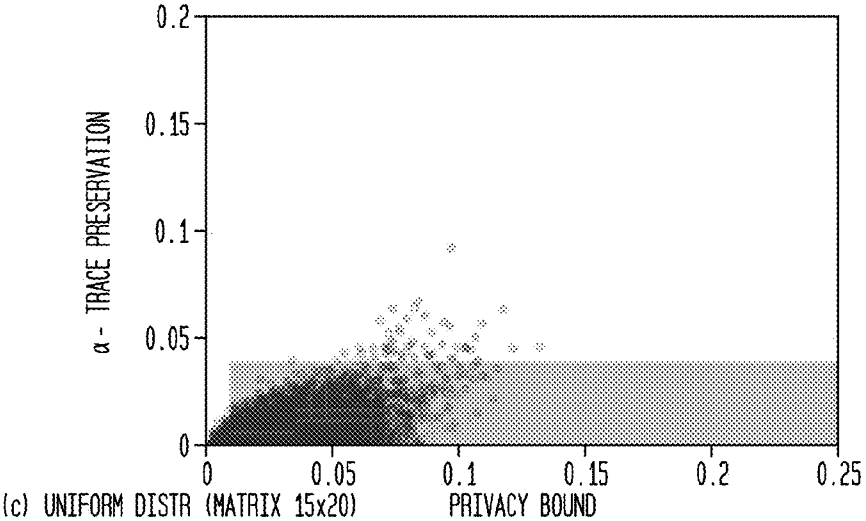
(c) UNIFORM DISTR (MATRIX 15x20) PRIVACY BOUND FIG. 10-3
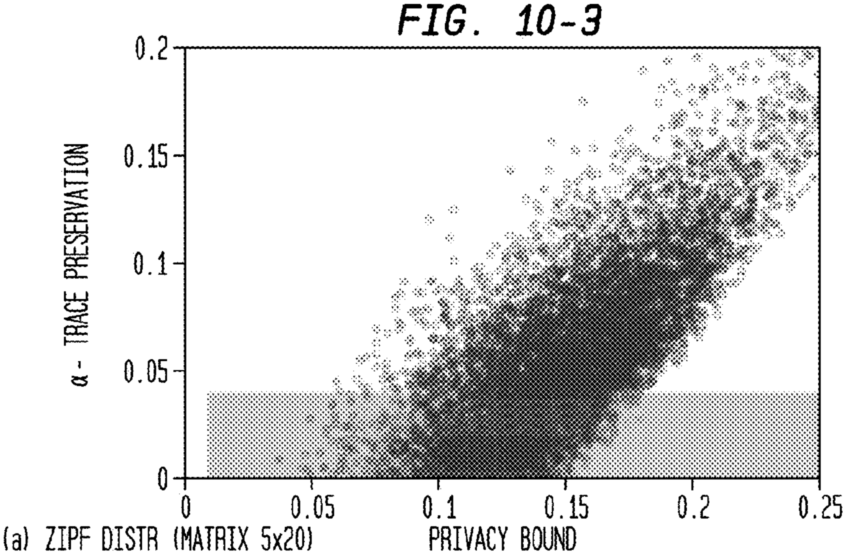
(a) ZIPF DISTR (MATRIX 5x20)
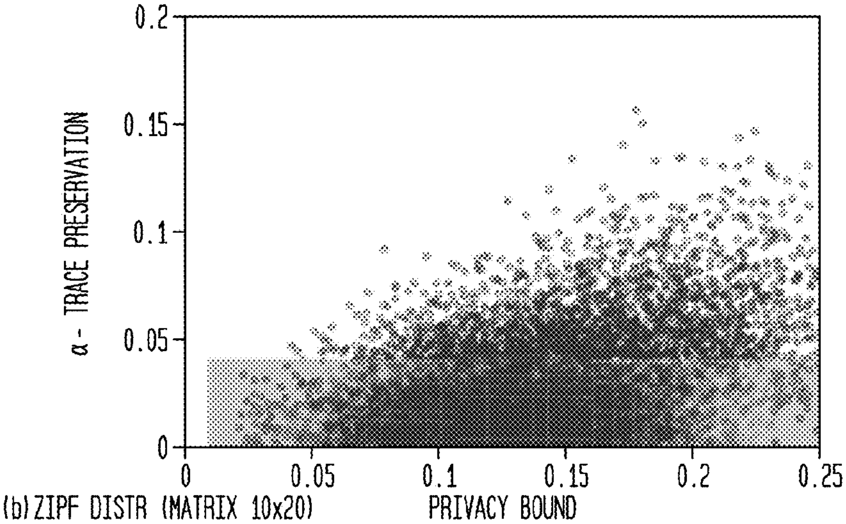
(b) ZIPF DISTR (MATRIX 10x20)
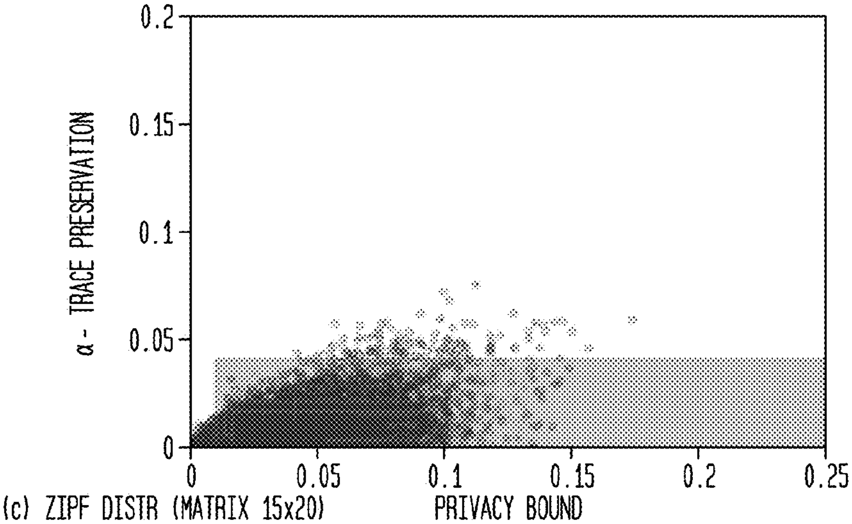
(c) ZIPF DISTR (MATRIX 15x20)

PRIVACY-PRESERVING AGGREGATED DATA MINING

This application claims the benefit of U.S. Provisional Application No. 61/585,179, entitled "Privacy-Preserving Aggregated Data Mining," filed on Jan. 10, 2012, which is incorporated herein by reference.

TECHNICAL FIELD

The present invention is directed, in general, to computer systems and, more specifically, to a system and method for preserving privacy in data mining.

BACKGROUND

Data privacy has become a growing concern due to rapid information dissemination and proliferation spurred by the growing popularity of social networks such as Facebook, Blogger, and Twitter, powerful search engines like Google and Bing, and by the increasing sophistication of data mining algorithms. The ability of these systems to track the action of individuals and reveal individual identities is reminiscent of the omnipresence of the Big Brother character in George Orwell's novel "1984," which renders big corporations an unassailable advantage from knowing so much about individuals. As a consequence, minor lapses can wind up affecting people's lives and careers. On the other hand, the epic demand for data mining and knowledge discovery in databases finds market relevance in contexts ranging from marketing analytics to retail merchandizing, and derives valuable statistical information for resource-conscious decision-making, thereby benefitting society at large. Therefore, a confluence of privacy confidentiality and accurate statistics presents special challenges. A central theme of privacy-preserving data mining is the interplay between privacy and data utility.

There have been numerous attempts at preserving privacy of data related to individuals in statistical databases that may be publicly accessible (e.g., over the Internet). A frequent objective of preserving data against "data mining" is to hide privacy information about individuals, while at the same time providing information that will be statistically accurate about a group. This problem has become extremely important and has been discussed in database and cryptography communities, mainly for two reasons. One reason is widespread proliferation and accessibility of individual information in statistical databases that may be produced by government organizations or corporations, and the other is increasing sophistication of data-mining algorithms. While objectives of processes introduced herein address the privacy issues associated with a statistical database, the underlying techniques are quite different when applied in the networks such as the Internet due to a need to provide a method that combines data compression with privacy protection.

In general, research related to strategies for privacy-preserving methods have been subsumed into anonymity, data swapping and data perturbation, depending on how privacy is being defined. Anonymity refers to replacing a true identifier in a database with an anonymous identity. For example, if the name of an employee is replaced with a quasi-identifier of compound attributes, it would be difficult at a later time to associate the employee's salary with the employee's true identity. Data swapping refers to a process for disclosure limitation for databases containing categorical variables. The values of sensitive variables are swapped among records in such a way that t-order frequency counts are preserved (i.e., entries in a t-way marginal table). Data perturbation problem refers to techniques for adding noise (e.g., white noise) to each original entry in a database table. Cell suppression methods provide limited statistical content. Controlled rounding methods modify existing statistical correlations, thus alter a proper statistical inference. The release of partial information insures confidentiality by restricting the level of details at which data are released, which often allows for proper statistical inference.

Current processes for preserving private data against data mining use a system component called a curator that is positioned between the original database system and the client. The primary goal of a curator is to answer questions while protecting privacy. Upon receipt of a query, the curator analyzes the query for a possible privacy leak. With respect to a very specific query, the curator adds a certain amount of distortion to the response, or simply ignores the query. On-line analysis of a query is not a trivial task. An attacker may figure out detailed information about individual records by carefully crafting a sequence of seemingly unrelated queries, and then use sophisticated mathematical tools to analyze responses to these queries.

A strategy of simply adding random noise to a query response can be vulnerable against a collaborative attack in which a group of attackers coordinate their effort by issuing the same query to the curator. The privacy of individual records can be compromised by averaging the responses. On-line analysis also requires a substantial amount of computational resources, which could have a significant impact on scalability and query performance. A strategy of creating a perturbed database by adding white noise cannot produce an accurate estimation of aggregated information.

Thus, prior solutions for privacy protection in databases have suffered significant limitations with respect to an ability to preserve privacy in data mining and have become substantial hindrances to constructing and providing general accessibility to such databases. Accordingly, what is needed in the art is a new approach that overcomes the deficiencies in the current solutions.

SUMMARY OF THE INVENTION

These and other problems are generally solved or circumvented, and technical advantages are generally achieved, by advantageous embodiments of the present invention, in which an apparatus, system and method are introduced for preserving privacy of data in a dataset in a database with a number n of entries. In one embodiment, the apparatus includes memory including computer program code configured to, with a processor, cause the apparatus to form a random matrix of dimension m by n, wherein m is less than n, operate on the dataset with the random matrix to produce a compressed dataset, form a pseudoinverse of the random matrix, and operate on the dataset with the pseudoinverse of the random matrix to produce a decompressed dataset.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 8 and 9 illustrate exemplary random and pseudoinverse matrices, respectively;

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Figure 1:
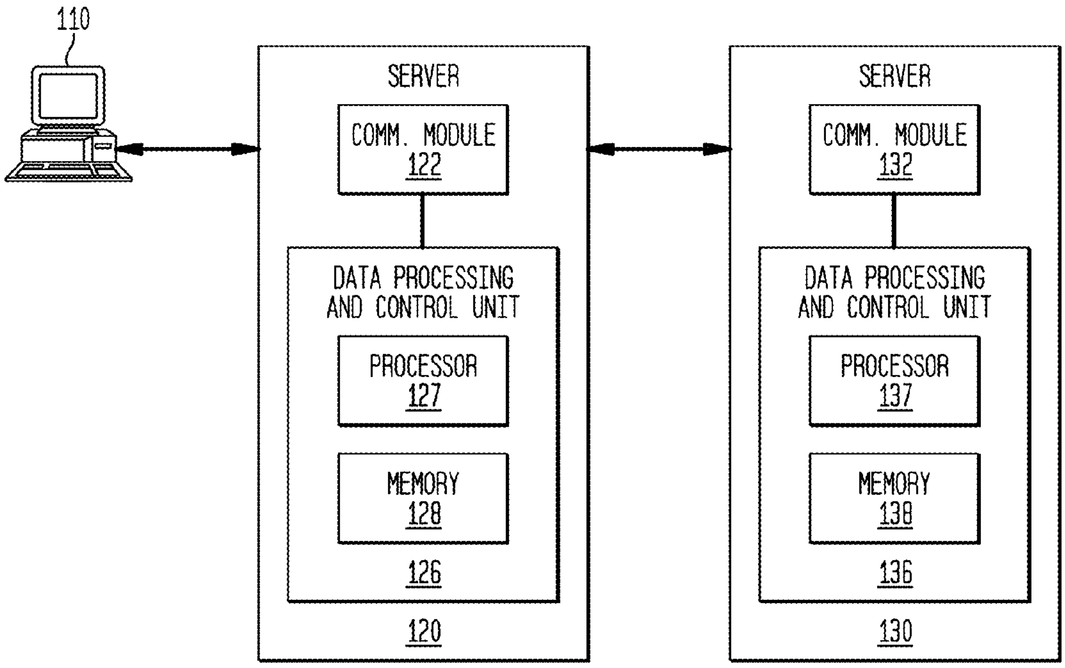
FIG. 1 illustrates a system level diagram of an embodiment of a system formed with a database server configured to provide privacy protection for a dataset in a database.

The making and usage of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems and modules associated with a process for providing privacy protection in a database.

A process is introduced herein and referred to as randomized compression for providing privacy protection in a statistical database. An objective is a degree of unrecoverable information loss about individual records while preserving information of aggregated data. The process includes encoding and decoding phases. The encoding phase combines dimension reduction, randomization and compression. The compression ratio is viewed as an adjustable parameter that reflects a degree of distortion.

In the decoding phase, a Moore-Penrose matrix pseudoinverse is used to create a statistical database that is provably resistant to a collaborative attack. A benefit of the process is that the generated database supports privacy protection without a need to modify the underlying database scheme and structured query language ("SQL") and also without a need to perform query-tailored vulnerability analysis.

A compressed version of a database is produced by processes having properties as set forth below. One property is the more specific a query, the more ambiguous the answer. Another property is the more general a query, the more accurate the answer. This is an uncertainty principle underlying privacy-preserving data mining.

Processes are introduced herein to protect individual records while providing accurate aggregated database information. Disclosure control is provided via the introduction of lossy database information. The processes provide the addition of noise to the data, providing disclosure control by increasing a noise-to-signal ratio.

The processes introduced herein can be viewed as a special type of lossy compression. The loss of information during processing makes it substantially impossible to fully recover an individual record, while providing accurate aggregate information about a group of records. This is done by randomizing and compressing the original data using a special type of random matrix mapping. The restored database information is more uniform than that in the original database. This feature is exploited to disguise individual records, while providing accurate aggregate information about the underlying data population. Accordingly, more accurate estimation of aggregate data can be provided.

From a system perspective, processes introduced herein do not require a change to an underlying database scheme, and do not require a change to the user environment. The original database scheme and access environment can be retained. A special type of random matrix is adopted with dimension reduction and Moore-Penrose pseudoinversion. The combination of these techniques enables a privacy bound to be established for disclosure control for individual records, but preserves accurate estimation of aggregated data.

For a given $n\times 1$ matrix X (representing the original data), an $m\times 1$ compressed data matrix Y is generated, where $n>m$, by lossy compression employing a random mapping $m\times n$ matrix M. A reconstructed estimate (also referred to as a "perturbed dataset" and a distribution approximation") $\hat{X}$ of the original data matrix X is generated using the Moore-Penrose pseudoinverse $M^+$ of the random matrix M.

For a given $Y=MX$, let $$\hat{X}=M^+Y=M^+MX.$$

Then the following conditions are automatically satisfied:

$$\|MX-Y\|_2 \geq \|M\hat{X}-Y\|_2, \text{ and} \qquad \text{Condition 1:}$$

$$\|\hat{X}\|_2 \leq \|X\|_2, \qquad \text{Condition 2:}$$

where $\|.\|_2$ is the Euclidean norm.

Condition 1 above shows the direction of "data encryption," meaning that once the original data matrix X is translated to $Y=MX$, the best reconstructed estimate (recovery) of the original data matrix X is the reconstructed estimate $\hat{X}$. The norm $\|X-\hat{X}\|_2$ is referred to as the level of privacy protection.

Condition 2 means that the reconstructed estimate $\hat{X}$ is more uniform than the original data matrix X, indicating that the reconstructed estimate $\hat{X}$ is majorized by the original data matrix X in the theory of majorization. The mathematical implication is that the reconstructed estimate $\hat{X}$ is a good estimator for the original data matrix X on a group level, while it serves as a poor estimator for the original data matrix X on an individual level. This is a desirable property for a statistical database for privacy protection.

Based on the first condition, a bound is established as set forth below.

$$\|M\hat{X}-Y\|_2 = \|M\hat{X}-MX\|_2 \leq \|M\|_2\|\hat{X}-X\|_2\|\hat{X}-X\|_2 \geq \frac{\|M\hat{X}-MX\|_2}{\|M\|_2}$$

Let $\|X\|_0$ be the size of the original data matrix or vector X, the number of records (i.e., elements) in the original data matrix X. Then define:

$$\frac{\|X-\hat{X}\|_2}{\|X\|_0}$$

as a tunable system metric for privacy protection, denoted by the function α(X, M). The metric α(X, M) is a function of the original data matrix X and the random matrix M. The metric α(X, M) measures an average distance between a true record and a corresponding perturbed record.

Turning now to FIG. 1, illustrated is a system level diagram of an embodiment of a system formed with a database server 130 configured to provide privacy protection for a dataset in a database. The database server 130 communicates bidirectionally with a local server 120 coupled to a user equipment 110. As an example, the database server 130 may communicate bidirectionally with the local server 120 over the Internet. Accordingly, public access is provided for the user equipment 110 over the Internet to the protected dataset in the database server 130. As an example, the user equipment 110 may communicate with the local server 120 over a wireless path such as by using a smartphone. Similarly, the local server 120 may communicate with the database server 130 over a wireless path.

The database server 130 is formed with a communication module 132. The database server 130 includes a data processing and control unit 136 formed with a processor 137 coupled to a memory 138. Of course, the database server 130 includes other elements such as interface devices, etc. The database server 130 may provide access to a telecommunication network such as a public service telecommunications network ("PSTN"). Access may be provided using fiber optic, coaxial, twisted pair, microwave communications, or similar link coupled to an appropriate link-terminating element. The database server 130 is equipped with a transmission control protocol ("TCP") internetworking control component.

Assuming the database server 130 and local server 120 employ a wireless path therebetween, the communication module 132 of the database server 130 modulates information onto a carrier waveform for transmission via antenna(s) to the local server 120. A respective communication module 122 in the local server 120 demodulates information received via antenna(s) for further processing thereby. The communication modules 122, 132 are capable of supporting duplex operation. The communication modules 122, 132 facilitate the bidirectional transfer of information therebetween and with other communication elements.

The local server 120 is similarly formed with the communication module 122, and a data processing and control unit 126. The data processing and control unit 126 is similarly formed with a processor 127 and memory 128. The user equipment 120 is correspondingly formed with a communication module and a data processing and control unit to provide a user interface for a user choosing to access the dataset in database server 130.

The data processing and control units identified herein provide digital processing functions for controlling various operations required by the respective unit in which it operates, such as radio and data processing operations to conduct bidirectional wired or wireless communications between, for example, a server and a user equipment coupled to a respective base station. The processors in the data processing and control units are each coupled to memory that stores programs and data of a temporary or more permanent nature.

The processors in the data processing and control units, which may be implemented with one or a plurality of processing devices, performs functions associated with its operation including, without limitation, precoding of antenna gain/phase parameters, encoding and decoding of individual bits forming a communication message, formatting of information and overall control of a server or user equipment. Exemplary functions related to management of wired and wireless communication resources include, without limitation, hardware installation, traffic management, performance data analysis, configuration management, security, and the like. The processors in the data processing and control units may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories in the data processing and control units may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memories may form a data buffer for data transmitted to and from the same. The memories may store applications (e.g., virus scan, browser and games) for use by the same. Exemplary embodiments of the system, subsystems, and modules as described herein may be implemented, at least in part, by computer software executable by processors of the data processing and control units, or by hardware, or by combinations thereof.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

Figure 2:
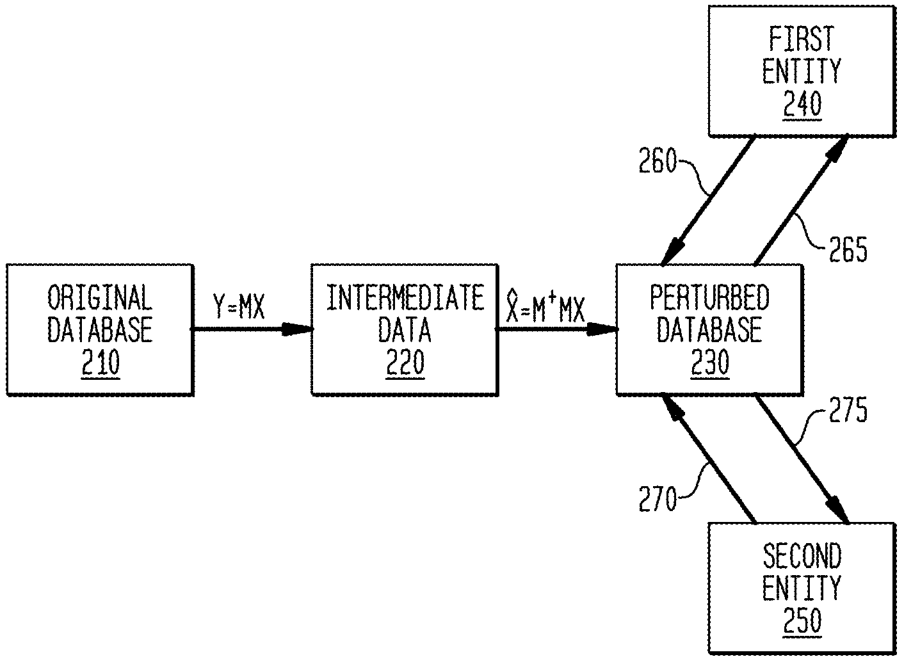
FIG. 2 illustrates a block diagram showing an exemplary generation of a privacy-preserving statistical/perturbed database via randomization, compression and Moore-Penrose pseudoinversion.

Turning now to FIG. 2, illustrated is a block diagram showing an exemplary generation of a privacy-preserving statistical/perturbed database (also referred to as a perturbed database 230) via randomization, compression and Moore-Penrose pseudoinversion. FIG. 2 illustrates a drawing of an encoding and decoding arrangement showing a process flow. An original database 210 containing an original data matrix X is compressed with a random matrix M to produce intermediate data 220. The intermediate data 220 is then decompressed with pseudoinverse matrix $M^+$ to produce a perturbed dataset $\hat{X}$ in the perturbed database 230. When a first entity 240 issues a specific query 260 to the perturbed dataset 230, an ambiguous response 265 is provided. However, when a second entity 250 issues a generic query 270 to the perturbed database 230, an accurate response 275 is provided while preserving privacy of data in the dataset in the original database 210.

Figure 3:
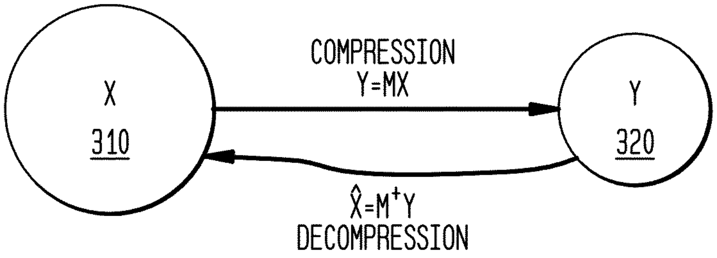
FIG. 3 illustrates an exemplary process showing encoding from a higher dimensional space into a lower dimensional space, and decoding from the lower dimensional space back into the higher dimensional space.

Turning now to FIG. 3, illustrated is an exemplary process showing encoding from a higher dimensional space 310 into a lower dimensional space 320, and decoding from the lower dimensional space 320 back into the higher dimensional space 310. Once the original data matrix X is randomized into a compressed form, an unrecoverable loss of information is created that provides disclosure restriction for individual records. The compressed data matrix Y is compressibly encoded from the original data matrix X, and it is mathematically impossible for reliable recovery of the original data matrix X from the compressed data matrix Y. An estimate $\hat{X}=M^+Y$ is the best guess of the original data matrix X. The Moore-Penrose pseudoinverse allows establishment of a mathematical bound for disclosure restriction for a given random mapping matrix. This bound mathematically ensures that with release of the reconstructed estimate $\hat{X}$, the level of confidentiality protection is $\|X-\hat{X}\|_2$, providing adequate protection to individual records while preserving some aggregated information about the original data matrix X. As an example, all entries or elements in the random matrix M are non-negative, which produces only additive combinations (compression). The non-negativity constraint implies preserving information rather than destroying information during data compression and reconstruction.

For a dataset formed with n elements, a query class is defined as denoted Q. The query class Q is then decomposed into n disjoint query subclasses $Q_1, \ldots, Q_n$, where $Q_k$ refers to a query subclass in which all queries require accessing k individual records. The query subclass $Q_1$ is the most specific query subclass, while query subclass $Q_n$ is the most general query class. For example, sum and average queries operative over all individual records fall into the query subclass $Q_n$. A query class Q is thus defined according to the generality or specificity of a query. The goal is to generate a perturbed database that produces ambiguous results with respect to queries in query subclass $Q_1$ while producing accurate results for queries in query subclass $Q_n$. It is clear that the metric $\alpha(X, M)$ is viewed as the average error over query subclass $Q_1$ as it measures the average distance between an actual element and its estimated element. A total average query falls into query subclass $Q_n$.

Figure 4:
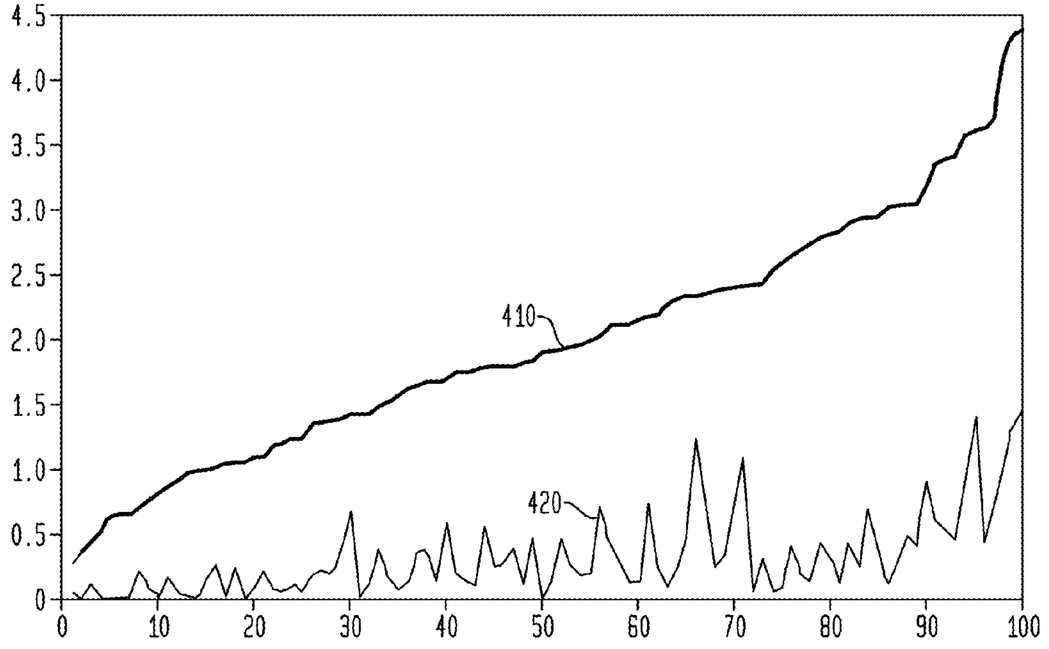
FIGS. 4 and 5 illustrate exemplary plots demonstrating properties of query subclasses introduced with respect to FIG. 3.
Figure 5:
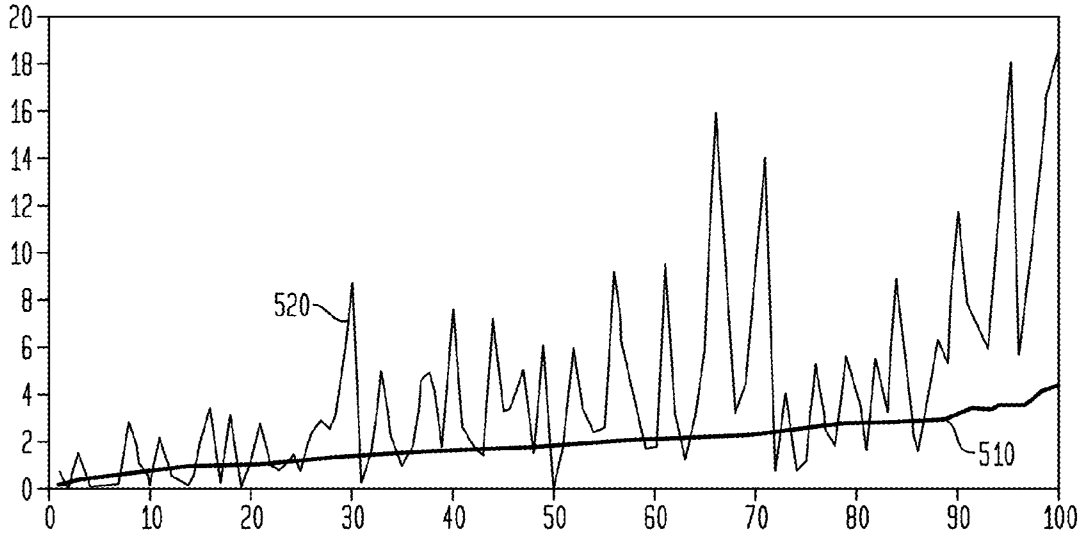

Turning now to FIGS. 4 and 5, illustrated are exemplary plots demonstrating properties of query subclasses $Q_1$, $Q_n$ for 100 randomized mappings introduced with respect to FIG. 3. FIG. 4 illustrates exemplary plots of a pairwise error in query subclass $Q_1$ (the line 410) and an error of the total average in query subclass $Q_n$ (the line 420). The line 410 represents the average pairwise distance on the vertical axis between an estimated element and an actual element (a metric $\alpha(X, M)$). The line 420 represents a distance between an estimated average data and average actual data. FIG. 5 illustrates plots of a pairwise error on the vertical axis in query subclass $Q_1$ (the line 510, the metric $\alpha(X, M)$) and an error of the total sum in query subclass $Q_n$ (the line 520).

An observation from FIGS. 4 and 5 prompts an algorithm for identifying a random matrix that satisfies the pairwise disclosure level or metric $\alpha(X, M)$ while meeting an aggregated database accuracy (e.g., the error of a total sum). For example, for a given original data matrix X, a random matrix M is found such that the metric $\alpha(X, M)>\beta$ for some parameter $\beta$, and the error of the total sum is less than a parameter $\delta$.

A perturbed database has been created by adding white noise to each record to provide disclosure restriction to individual records. Such processes, however, may not provide the most accurate estimation for aggregated data. For example, for a query requesting the sum of one thousand records, the query against the perturbed database is formulated as follows:

$$\Sigma_{k=1}^{1000}[X[k]+n(0,1)]=\Sigma_{k=1}^{1000}X[k]+\Sigma_{k=1}^{1000}n(0,1),$$

where X[k], $(1\leq k\leq 1000)$ is a matrix representing the original records and n(0, 1) represents independent white noise samples with zero mean and unity variance. The sum over the perturbed database can be represented by $\Sigma_{k=1}^{1000}X[k]$ plus $\Sigma_{k=1}^{1000}n(0,1)$.

Figure 6:
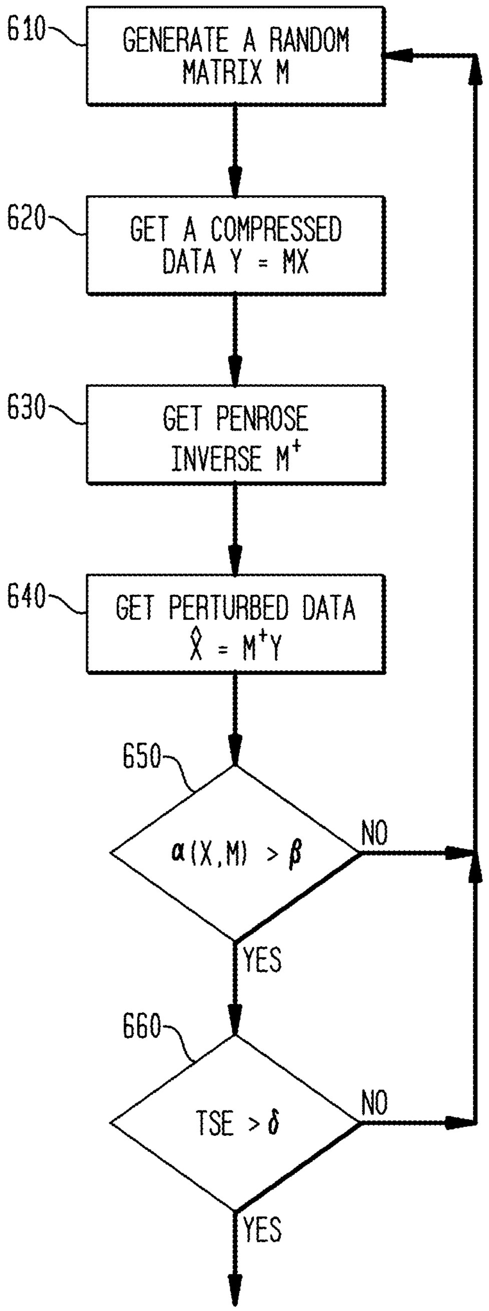
FIG. 6 illustrates a flow chart demonstrating an exemplary method for choosing a random matrix that satisfies a disclosure control/privacy condition for individual records and an accuracy of an aggregated estimation.

Turning now to FIG. 6, illustrated is a flow chart demonstrating an exemplary method for choosing a random matrix M that satisfies a disclosure control/privacy condition for individual records and an accuracy of an aggregated estimation. The method begins at a step or module 610 in which a random matrix (e.g., random stochastic matrix) M is generated. In a step or module 620 compressed data matrix Y is produced by multiplying the original data matrix X by the random matrix M. In a step or module 630 a pseudoinverse matrix $M^+$ is generated from the random matrix M. In step or module 640, a perturbed dataset $\hat{X}$ is produced by multiplying the compressed data matrix Y by the pseudoinverse matrix $M^+$. In a step or module 650, a pairwise disclosure level or metric $\alpha(X, M)$ is compared with a parameter $\beta$. If the metric $\alpha(X, M)$ is less than the parameter $\beta$, the method returns to the step or module 610. Otherwise the method continues in a step or module 660. In the step or module 660, the total sum error ("TSE") is compared with the parameter $\delta$. If the TSE is greater than the parameter $\delta$, the method returns to the step or module 610. Otherwise, a satisfactory random matrix M has been found, and the method ends.

Figure 7:
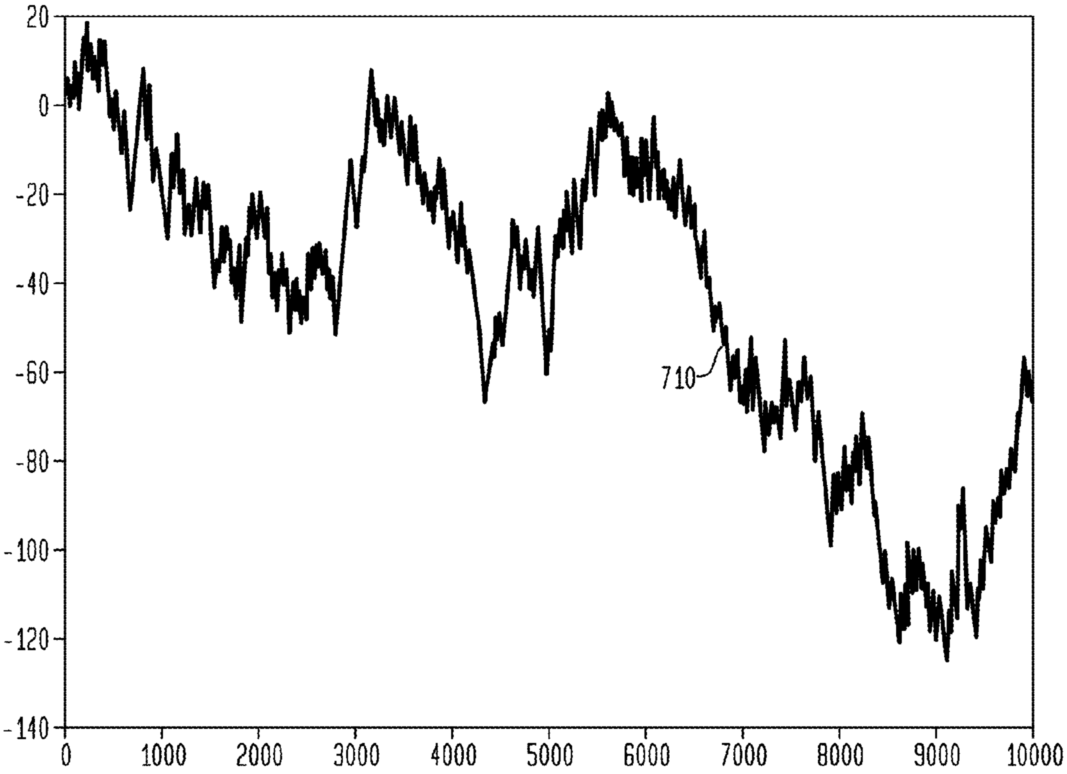
FIG. 7 illustrates a graphical representation showing that the sum of Gaussian noise producing a random walk varies widely, resulting in a large estimation error for a query sum.

Turning now to FIG. 7, illustrated is a graphical representation showing that the sum of Gaussian noise producing a random walk 710 varies widely, resulting in a large estimation error for a query sum. FIG. 7 illustrates that the sum of Gaussian noise resulting from 10,000 random samples in a perturbed database does not provide an accurate estimation of aggregated data by simply adding white noise into each record.

An example is now described that illustrates features presented hereinabove in accordance with FIGS. 8 and 9 showing a random matrix M and a pseudoinverse matrix $M^+$, respectively. Consider a hypothetical database of 13 employees called employee formatted and structured as shown in Table I below. For the purposes of the example, an employee identification ("ID") is long, the name is char[512], the age is an integer, the salary is a float and the department is long.

TABLE I

| Actual Employee Age and Salary | | | | |
|---|---|---|---|---|
| Employee ID | Name | Age | Salary | Department |
| 1 | A | 20 | 90,202 | 1 |
| 2 | B | 23 | 88,930 | 1 |
| 3 | C | 45 | 93,493 | 1 |
| 4 | D | 43 | 150,202 | 1 |
| 5 | E | 67 | 188,930 | 1 |
| 6 | F | 33 | 78,493 | 1 |
| 7 | G | 24 | 90,202 | 2 |
| 8 | H | 29 | 81,202 | 2 |
| 9 | I | 56 | 138,930 | 2 |
| 10 | J | 67 | 179,932 | 2 |
| 11 | K | 34 | 108,930 | 2 |
| 12 | L | 70 | 193,493 | 2 |
| 13 | M | 60 | 200,230 | 2 |

The age and salary of an employee are considered to be private information that should be protected from leaking. At the same time, however, it is desirable to provide accurate aggregate information at a departmental level.

It can be seen from FIG. 6, that a random matrix M is generated that randomizes and compresses the original data into an intermediate compressed format. By choosing the parameter β=2, and Total Sum Error ("TSE")<0.1, the method illustrated in FIG. 6 is run to choose a random matrix M that satisfies both a privacy condition and aggregated database accuracy. Over a total of 100 random matrices, 21 random matrices were found that satisfy the conditions. A random matrix M is chosen that has $\|X-\hat{X}\|_2=2.45$ and TSE=0.018.

Consider the original data matrix X to be an n-by-1 vector (a matrix), and the random matrix M to be an m-by-n matrix (n>m). To be concrete, let n=13, and m=10. The ratio m/n is viewed as a compression ratio. Thus, the random matrix M is a random 10-by-13 matrix that compressibly maps the original data matrix X into intermediate data, the m-by-1 compressed data matrix Y. The random matrix M compresses 13-dimensional data into a 10-dimension space, and each entry in the random matrix M is randomly selected from, for instance, the set $\{1, 2, 4, \ldots 2^n\}$ and is then normalized by a sum of each entry on the same row. An exemplary random matrix M is illustrated in FIG. 8. An m-by-1 vector results from randomizing and compressing age=$[20\ 23\ 45\ 43\ 67\ 33\ 24\ 29\ 56\ 67\ 34\ 70\ 60]^T$ by performing operations with the random matrix M. Through mathematical operations, based on the random matrix M, one can obtain the n-by-m Moore-Penrose pseudoinverse matrix $M^+$ as illustrated in FIG. 9.

In a similar fashion, another random matrix M can be generated for salary data. As a result, the perturbed database table is then created as shown in Table II below.

TABLE II

| Perturbed Employee Age and Salary | | | | |
|---|---|---|---|---|
| Employee ID | Name | Age | Salary | Department |
| 1 | A | 44.34 | 113,900.45 | 1 |
| 2 | B | 23.17 | 126,674.45 | 1 |
| 3 | C | 37.11 | 84,469.74 | 1 |
| 4 | D | 38.79 | 136,789.24 | 1 |
| 5 | E | 62.99 | 191,471.31 | 1 |
| 6 | F | 28.09 | 90,250.10 | 1 |
| 7 | G | 30.18 | 76,218.82 | 2 |
| 8 | H | 35.39 | 90,050.95 | 2 |
| 9 | I | 44.06 | 110,211.92 | 2 |
| 10 | J | 73.19 | 173,028.44 | 2 |
| 11 | K | 32.48 | 91,753.97 | 2 |
| 12 | L | 66.23 | 211,076.64 | 2 |
| 13 | M | 54.92 | 178,119.59 | 2 |

The perturbed database has the same scheme as the original one, but provides privacy protection for individual records, without the need to perform query-tailored analysis. For example, if an attacker wants to know the salary and age of employee H, the attacker can issue a request using a structured query language ("SQL") statement, select age, salary from an employee where Name=H in Table II. The returned result is that the age of employee H is about 35.39 and the employee salary is 90,050.95, while the employee's true age is 29 in Table I and the employee's true salary is 81,202. The result obtained by the attacker differs from the true values.

The perturbed database created by this process can provide accurate aggregate information. Suppose a survey study conducted by the Institute of Electrical and Electronic Engineers ("IEEE") needs information about the average age and average salary of a department. An SQL statement can be issued such as select ave(age), ave(salary) from employee. The returned values are that the average age is 43.921669 and the average salary is 128,770.43, in comparison to the true average age 43.92 and true average salary 129,475.

If the human resources ("HR") department wants to conduct a survey for a department-level comparison, the HR administrator can issue a SQL statement such as select department, ave(age), ave(salary) from employee group by department. The returned values of the SQL query are:

Department 1: the average age is 39.08, and the average salary is 123,925.9, and Department 2: the average age is 48.06, and the average salary is 132,922.9, which are very close to the actual values as follows:

Department 1: the average age is 38.5, and the average salary is 115,041.7, and

Department 2: the average age is 48.57, and the average salary is 141,845.6.

Through this example, it is shown that the process introduced herein is based on maintaining data-level privacy protection in a publicly accessible database and providing accurate aggregate information, while protecting the privacy of individual records. A salient feature is retention of the original database scheme and of the access environment.

Thus, a special form of a random matrix (e.g., a random stochastic matrix) has been introduced to uniformly scramble and compress original data in a statistical database from a higher dimensional space into a lower dimensional space. A Moore-Penrose pseudoinverse is used to separate original data from its compressed form, aiming to establish a lower confidentiality bound for privacy protection. The approximated data possess desirable properties of aggregated data in a statistical database, wherein the more specific a query, the more ambiguous an answer. Describing further the privacy-preserving database problem, users are allowed to query a published dataset in such a way that a set of basic properties is satisfied. Most notably, users can recover a reasonably close answer to their queries, often referred as "utility," and data publishers maintain a certain amount of privacy about individual dataset values, often referred to as "privacy."

A variant of the privacy-preserving data publishing problem is considered where data publishers apply a stochastic perturbation to the dataset and only publish a perturbed version on which users can later issue their queries. Here, the challenge is applying perturbations that provide privacy gains while not significantly compromising utility expectations. The formal description of models and solutions employed herein is based on notions and techniques from linear algebra. As the notions and techniques can deal with datasets with multiple attributes by operating independently on each attribute, it is restricted, for simplicity, to give attention to single attribute datasets. Specifically, the original data is modeled as a real valued, n-dimensional, vector or matrix $X=(x_1, \ldots, x_n)\square R_n^+$. A dataset perturbation F is a (possibly probabilistic) function that maps the original data matrix X to a perturbed dataset $\hat{X}$. If the perturbed dataset $\hat{X}$ is a real-valued and n-dimensional vector (like the original data matrix X), then the dataset perturbation F is a schema-preserving dataset perturbation.

Two properties of dataset perturbations, utility and privacy, are now addressed. In formalizing the utility property, a specific function of the data is captured that well aggregates the n dataset components. The following specific example function is described as the trace of a real-valued, n-dimensional, vector X defined as the sum of all components $$\left(i.e., tr(X) = \sum_{i=1}^{n} x_i\right).$$

The following definition is considered as a utility notion for dataset perturbation functions.

Definition 1. Let $\alpha\geq 0$ and let F be a dataset perturbation. The dataset perturbation F is $\alpha$-trace-preserving if $|tr(F(X))-tr(X)|\leq\alpha|tr(X)|$. The dataset perturbation F is trace-preserving if it is $\alpha$-trace-preserving for $\alpha=0$.

In formalizing the privacy property, various notions and variants are considered including a linear algebra notion coming in three variants (one variant vector-based and two variants component-based), a geometric notion and an information theory notion. In all these notions, it is assumed that the original data matrix $X-(x_1, \ldots, x_n)$ be an n-dimensional dataset, and the perturbed dataset $\hat{X}=(\hat{x}_1, \ldots, \hat{x}_n)$ be the n-dimensional perturbed dataset obtained by applying the dataset perturbation F to the original data matrix X.

Definition 2. Let $i\in(1, \ldots, n)$ and $\epsilon\geq 0$. The dataset perturbation F satisfies i-coordinate $\epsilon$-privacy if and only if $|x_i-\hat{x}_i|\leq\epsilon|x_i|$. Definition 2 states that the risk of personalized privacy breach entails if the estimate is within a small vicinity of the original point. This coordinate-wise privacy notion is now extended into a vector based notion as set forth below.

Definition 3. Let $\epsilon\geq 0$. The dataset perturbation F satisfies (vector based) $\epsilon$-privacy if and only if $\exists i\in\{1, \ldots, n\}$ such that the dataset perturbation F satisfies i-coordinate $\epsilon$-privacy. The symbol "$\exists$" means "there exists" and the symbol "$\in$" means "is an element of"). It is observed that vector-based $\epsilon$-privacy notion is much stronger than the coordinate-wise notion. Indeed, if the dataset perturbation F does not satisfy vector-based $\epsilon$-privacy, then it does not satisfy i-coordinate $\epsilon$-privacy for all $i=1, \ldots, n$.

Definition 4. Let $i\square\{1, \ldots, n\}$ and $\epsilon\geq 0$. The dataset perturbation F satisfies i-personalized $\epsilon$-privacy if and only if the number of $i\sqsubset\{1, \ldots, n\}$ such that the dataset perturbation F satisfies i-coordinate $\epsilon$-privacy is less than or equal to $\epsilon_n$.

The cosine similarity metric is widely used in information retrieval and text matching where vectors are referred to as document vectors for storing the term frequencies.

Definition 5. For a given original and compressed data vectors or matrices X, Y, the cosine similarity is defined as:

$$\cos(\theta)=\langle X,Y\rangle\|X\|_2\|Y\|_2$$

and the similarity angle is defined as $\theta(X, Y)=\arccos[\langle X, Y\rangle/(\|X\|_2\|Y\|_2)]$. The cosine similarity measures a degree of similarity between two vectors. Two vectors are completely identical if the cosine similarity is 1, and two vectors are completely opposite if the cosine similarity is −1. In-between values indicate intermediate similarity or dissimilarity. Two vectors are mutually orthogonal (independent) when the cosine similarity is 0. In the case that the original and compressed data vectors X, Y are document vectors, their cosine similarity will range from 0 to 1, since the term frequencies cannot be negative. The angle $\theta$ between two term frequency vectors cannot be greater than 90 degrees.

The uncertainty of the original data matrix X is defined as:

$$H(x) = \sum_{x\in X} p(x)\log(p(x))$$

where p(x) is the probability density of the original data matrix X. The mutual information is used to measure the similarity between the original data matrix X and the perturbed dataset $\hat{X}$ as follows:

$$I(X, \hat{X}) = \sum_{x\in X}\sum_{\hat{x}\in\hat{X}} p(x, \hat{x})\log\left(\frac{p(x, \hat{x})}{p_1(x)p_2(\hat{x})}\right),$$

where $p(x, \hat{x})$ is the joint probability of the original data matrix X and the perturbed dataset $\hat{X}$, and $p_1(x)$ and $p_2(\hat{x})$ are the marginal probability density functions of the original data matrix X and the perturbed dataset $\hat{X}$, respectively. The conditional entropy (uncertainty) denoted as $H(X|\hat{X})=H(X)-I(X, \hat{X})$ measures the information conveyed about the original data matrix X by the perturbed dataset $\hat{X}$. The mutual information plays an important role in communication theory. It represents the amount of information processed by the channel when the original data matrix or vector X is an input vector to the channel and perturbed dataset $\hat{X}$ is the output vector. Definition 6. Let the original data matrix X and the perturbed dataset $\hat{X}$ be the input and output vectors, respectively. The channel is said to be lossless if the uncertainty $H(X|\hat{X})=0$ and the channel is said to be deterministic if the uncertainty $H(\hat{X}|X)=0$.

Definition 7. A random matrix M is called Hermitian if and only if $M=M^*$. A random matrix M is called normal if $MM^*=M^*M$. If the random matrix M is an n-by-n Hermitian matrix, and the original data matrix X is an n-dimensional vector, then the Rayleigh-Ritz quotient R with respect to the random matrix M and the original data matrix X is defined as:

$$R(M,X)=\langle X,MX\rangle/\|X\|_2^2, \|X\|_2\neq 0$$

where $\langle,\rangle$ denotes the Euclidean inner product.

Let $M\sqcap R^{m\times n}$ be an m-by-n matrix. Then matrix norm $\|M\|_2$, which refers as the spectral radius of the random matrix M, is $$\|M\|_2=\max\{\sqrt{\lambda}:\lambda \text{ an eigenvalue of } M^*M\}.$$

A random matrix M is said to be a contraction if $\|M\|\leq 1$. A positive random matrix M is contractive if and only if $A\leq I$.

A square matrix P is called doubly stochastic if its entries are nonnegative, and its column sums and its row sums are 1. A square matrix P is called doubly substochastic if its row sums are less than 1. A square matrix P is called doubly superstochastic if its column sums are less than 1.

Let M∈$R^{m \times n}$ be an m-by-n matrix. Then matrix norm $\|M\|_2$, which refers as the spectral radius of the random matrix M, is:

$$\|M\|_2=\max\{\sqrt{\lambda}:\lambda \text{ an eigenvalue of } M^*M\}.$$

A random matrix M is said to be a contraction if ||M||≤1. A positive matrix M is contractive if and only if A≤I. A square matrix P is called doubly stochastic if its entries are nonnegative, and its column sums and its row sums are 1. A square matrix P is called as doubly substochastic if its row sums are less than 1. A square matrix P is called as doubly superstochastic if its column sums are less than 1.

In order to set the stage for the problem exposition, M□$R^{m \times n}$ is defined to be a rectangular substochastic matrix from the original data matrix X□$R^n$ to Y□$R^m$, where $m_{i,j}$□M is first generated by the uniform distribution in the range of [0, 1] and then normalized by the sum of entries in the same row. Hence, the random matrix M is called positivity-preserving. This type of matrix could be thought of as a generalization of orthogonal matrices, in which the row vectors are locally almost orthogonal rather than globally perfectly orthogonal, thus possessing many nice features of orthogonal matrices.

Let the original data matrix X□$R^n$ be a microdata vector and Y□$R^m$ and M□$R^{m \times n}$ be a stochastic matrix and (m<n). The term 1-m/n is referred to as a compression ratio and the compressed data matrix Y as a lower dimensional sketch Y=MX.

An objective of constructing a low-dimensional sketch Y=MX is to preclude the possibility of exact recovery, thereby protecting the privacy of individual records. A goal of approximating the original data matrix X from the low-dimensional sketch of the compressed data matrix Y is to establish a lower privacy bound. It is achieved by identifying X* such that Y=MX* and ||X*||2 is minimal. $M^+$, which is called the Moore-Penrose inverse of the random matrix M, can be uniquely determined, satisfying the following four conditions:

$$MM^+M=M, \quad 1)$$

$$M^+MM^+=M^+, \quad 2)$$

$$(MM^+)^*=(MM^+), \quad 3)$$

$$(M^+M)^*=M^+M. \quad 4)$$

where X* denotes the complex conjugate transpose of the original data matrix X.

It is possible to verify that P=$MM^+$ is an orthogonal projection operator that satisfies:

$$P=P^2, \text{ and } P^*=P.$$

The matrix I−$M^+$M is the orthogonal projection onto the kernel of the random matrix M as:

$$M(I-M^+M)=(M-MM^+M)=0.$$

It is possible to verify that $M^+$M is normal according to Definition 7.

Turning now to an example, a Lemma 1 is ||MP+(I−$MM^+$)Q||=||MP||+||(I−$MM^+$)Q||. The proof follows from the fact that the random matrix M and (I−$MM^+$) are orthogonal. A perturbed dataset $\hat{X}$∈$R^n$ can be expressed as $\hat{X}=M^+Y=M^+MX$, where $M^+$ is the well-known Moore-Penrose inverse of the random matrix M. A perturbation strategy is set forth below in Table III.

TABLE III

ALGORITHM 1: Perturbed dataset

```
input   : X {original dataset}, (ρ, alpha) privacy-utility
              condition}
output: X̂ {Perturbed dataset}
begin
    repeat
        generate a matrix M_{m×n};
        Y = MX                /* a lower-dimen sketch */;
        X̂ = M⁺Y               /* distr approximation */;
        q = ρ(M, X)           /* lower privacy bound */;
        t = |tr(X) − tr(X̂)|/|tr(X)|
        /* α−trace-preservation */;
    until (ρ > g and t ≤ α);
    return X̂
end
```

As illustrated and described hereinabove with reference to FIG. 3, the process introduced herein employs a random matrix such as a random stochastic matrix to compress high-dimensional data into a low-dimensional sketch. This establishes a lower privacy bound that hinders the possibility of exact recovery of individual records without recourse to explicit noise introduction. The following theorem states that $\hat{X}=M^+Y$ is the best approximation of the original data matrix X from a lower dimensional sketch Y=MX.

Theorem 1. M+Y is a unique best approximate solution of MX=Y. This implies:

(a) $\|Y-M\hat{X}\|_2 \le \|Y-MX\|_2$, and (b) if $\|Y-M\hat{X}\|_2=\|Y-MX\|_2$, then $\|\hat{X}\|_2 \le \|X\|_2$.

Proof:

$$\|MX-Y\|=\|M(X-M^+Y)+(I-MM^+)(-Y)\|=\|MX-MM^+Y)\|+\|(MM^+Y-Y)\|\le\|M(M^+Y)-Y\|=\|M\hat{X}-Y\|,$$

which proves Theorem 1(a) above. The equality of the proof above holds if $MX=MM^+Y$ (($MX=M\hat{X}$).

A general solution to MX=Y is expressed as $X=M^+Y+(I-M^+M)u$, where u is an arbitrary vector. The general solution implies that:

$$MX=MM^+Y=M\hat{X}$$

as $$M=MM^+M.$$

Since u is an arbitrary vector, it is assumed that u=X, $$\begin{aligned} \|X| &= \|M+MX+(I-M+M)X\| \\ &= \|M+MX\|+\|(I-M^+M)X\| \\ &= \|\hat{X}\|+\|X-\hat{X}\|. \end{aligned}$$

The above equation holds since ($M^+$M) and (I−$M^+$M) are mutually orthogonal. As a result, $$\|X\|\ge\|\hat{X}\| \text{ if } MX=MM^+Y-M\hat{X}.$$

Thus, theorem 1(b) is proved. It is natural to cast the distance between the original data matrix X and the perturbed dataset $\hat{X}$, $$\|X-\hat{X}_2,$$

as the overall disclosure restriction. The lower and upper bounds on privacy disclosure is expressed as:

$$\|X\|_2-\|\hat{X}\|_2\le X-\hat{X}\|_2=\|X-M^+MX\|_2=\langle X,(I-M+M)X)\rangle^{1/2}\le\|I-M+M\|_2\cdot\|X\|_2$$

The above equation provides considerable insight into the relationship between the privacy disclosure restriction $\|X-\hat{X}\|_2$, the random matrix M, and the original data matrix X. The following relationship:

$$\|X-\hat{X}\|_2/\|X\|_2$$

is a normalized privacy disclosure ("NPD"). The lower and upper bounds on the NPD become:

$$1-\|\hat{X}\|_2/\|X\|_2 \le \|X-\hat{X}\|_2/\|X\|_2 \le \|I-M^+M\|_2.$$

By Definition 7, the NPD is an alternative, but equivalent, definition of the square root of Rayleigh-Ritz quotient $R(I-M^+M,X)$.

Define $\rho(M,X)=1-\|\hat{X}\|_2/\|X\|_2$ to be a lower bound and $\beta(M)=\|I-M^+M\|_2$ to be an upper privacy bound, which turns out to be the spectral radius of $I-M^+M$ as $I-M^+M$ is normal as $I-M^+M=(I-M^+M)^T$.

Theorem 2. The lower bound $\rho(M,X)\ge 0$ and the upper bound $\beta(M)\le 1$.

Proof. It follows from Theorem 1(b) above that $\|\hat{X}\|2\le\|X\|_2$. Thus $\rho(M,X)=1-\|\hat{X}\|_2/\|X\|_2\ge 0$. It is possible to show that rank $(M^+M)=r\le m$ as $\text{rank}(M^+M)\le\text{rank}(M)\le m$. There are orthogonal matrices $U_{m\times m}$ and $V_{n\times n}$ such that relation 1 is:

$$M_{m\times n} = U_{m\times m}\begin{bmatrix} D_{r\times r} & 0 \\ 0 & 0 \end{bmatrix}_{m\times n} V_{n\times n}$$

where $D=\text{diag}(\lambda_1, \ldots, \lambda_r, 0, \ldots, 0)$ and $\lambda_1\ge\lambda_2, \ldots, \ge\lambda_r$. Hence, relation 2 is:

$$M^+_{n\times m} = V^-_{n\times n}\begin{bmatrix} D^+_{r\times r} & 0 \\ 0 & 0 \end{bmatrix}_{n\times m} U^-_{m\times m}$$

where $U_{m\times m}^-$ and $V_{n\times n}^-$ refer to the inverse of $U_{m\times m}$ and $V_{n\times n}$, respectively, and $$D^+=D^-=\text{diag}(1/\lambda_1, \ldots, 1/\lambda_r, 0, \ldots, 0).$$

Since $U_{m\times m}$ and $V_{n\times n}$ are orthogonal matrices, then $U_{m\times m}^-=U_{m\times m}^*$ and $V_{n\times n}^-=V_{nn\times n}^*$. In other words, $U_{m\times m}^-U_{m\times m}=U_{m\times m}^*U_{m\times m}=I_{m\times m}$. Substituting relation 1-relation 2, we obtain:

$$I_{n\times n} - M^+M = I_{n\times n} - \begin{bmatrix} I_{r\times r} & 0 \\ 0 & 0 \end{bmatrix} = \begin{bmatrix} 0 & 0 \\ 0 & I_{(n-r)\times(n-r)} \end{bmatrix}.$$

This means that the maximum eigenvalue of the matrix $(I-M^+M)$ is unity, and thus:

$$\beta(M)=\|I-M^+M\|_2=1.$$

The upper privacy bound $\beta(M)$-1 is a constant, and is thus too loose to be useful in practice. For a given original data matrix X and random matrix M, one can calculate the square-root of Rayleigh-Ritz quotient $R(I-M^+M,X)$ (the normalized privacy bound) and the lower privacy bound $\rho(X,M)$. The main idea of the perturbation method is to use the size of a stochastic random matrix to strike a balance between privacy and utility.

The focus next is on the data mining utility on statistical information, which is considered as a difficult aspect of the privacy-preserving data mining problem. A framework is provided to exploit randomness in the stochastic matrix and identify a distribution approximation that meets both privacy and data utility requirements. The main idea is similar to the Monte Carlo method developed by John von Neumann. It exploits the randomness in a stochastic matrix to identify the stochastic random matrix M that satisfies the dual requirements:

1) the α-trace-preservation condition $|\text{tr}(X)-\text{tr}(\hat{X})|/|\text{tr}(X)|\le\alpha$, and 2) the lower privacy bound condition $\rho(X,M)\ge\rho$. These combined conditions form a permissible (ρ, α) privacy-utility area.

Returning to Algorithm 1 (reproduced below in Table IV), the Algorithm 1 provides a framework to exploit randomness in a stochastic matrix and identify a distribution approximation that meets both privacy and data utility requirements.

TABLE IV

ALGORITHM 1: Perturbed dataset

```
     input   : X {original dataset}, (ρ, alpha) privacy-utility
                 condition}
     output: X̂ {Perturbed dataset}
1    begin
2        repeat
3            generate a matrix M_{m×n};
4            Y = MX              /* a lower-dimen sketch */;
5            X̂ = M⁺Y              /* distr approximation */;
6            q = ρ(M, X)            /* lower privacy bound */;
7            t = |tr(X) − tr(X̂)|/|tr(X)|
             /* α−trace-preservation */;
8        until (ρ > q and t ≤ α);
9        return X̂
10   end
```

The steps in Algorithm 1 between lines 2-8 form the processing methodology. The step at line 3 is used generate a stochastic random matrix M. The step in line 5 computes the corresponding Moore-Penrose pseudoinverse $M^+$ and the distribution approximation $\hat{X}$. The steps between lines 6-7 calculate the actual α-trace-preservation and privacy bound. The step in line 8 checks the obtained (ρ, α) privacy utility point fall in the given permissible (ρ, α) privacy-utility area. The whole process is repeated until the generated distribution approximation $\hat{X}$ falls within the prescribed (ρ, α) privacy-utility condition.

To illustrate, we use the original data matrix X with size 20, generated by:

1) normal distribution (N(400, 20)), 2) uniform distribution(uniform (100, 1000)), and 3) Zipf distribution (α=2), respectively.

For each generated dataset, a stochastic random matrix M is used to uniformly compress the original data matrix X into a low-dimensional sketch (Y=MX), generate the perturbed dataset $\hat{X}=M^+Y$ from the sketch, and calculate a privacy utility point.

Figures 1, 10:
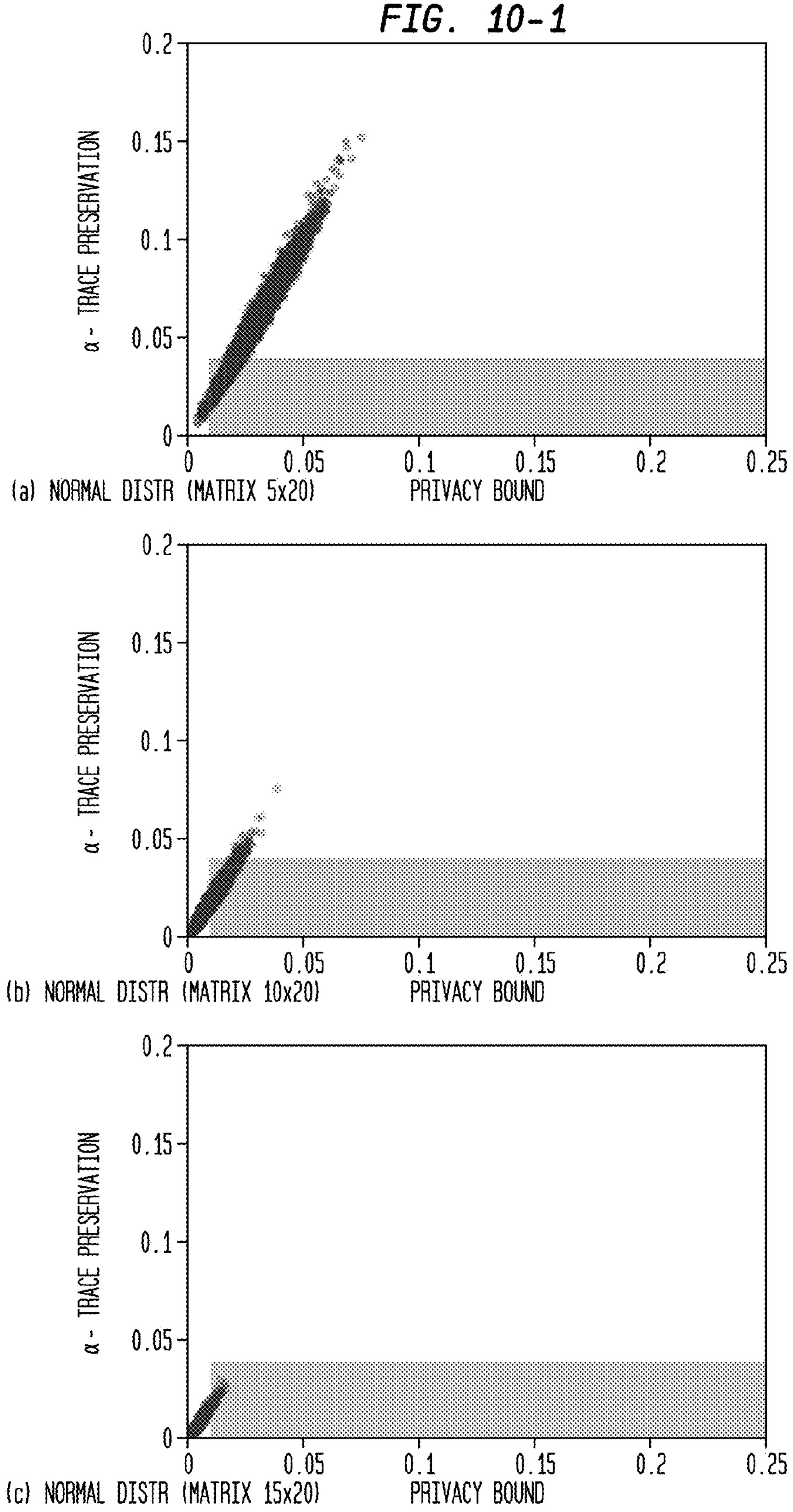
FIG. 10 illustrates graphical representations demonstrating a privacy utility scatter diagram generated by 10,000 random matrices.

Turning now to FIG. 10, illustrated are graphical representations demonstrating a privacy utility scatter diagram generated by 10,000 random matrices. The x-axis represents privacy level and the α-trace preservation level is on the y-axis. The grey rectangle in FIG. 10 represents a permissible (0.01, 0.04) privacy-utility area (α≤0.04 and ρ(M,X)≥0.01). The privacy-utility scatter diagrams provide insight into the subtle aspects of the perturbation model.

The size of a random matrix is an effective means of controlling privacy-utility scatter area. For example, a matrix of size 5 by 20 has a larger privacy-utility scatter area than a matrix of size 15 by 20. Observe that the original dataset has a significant impact on shaping the privacy-utility scatter pattern. The privacy and utility relations appear to be tightly correlated for the Gaussian distribution, and appear to be loosely correlated for the uniform and Zipf distributions. This means that for certain distributions with tightly correlated privacy and utility, the privacy and data utility are in essence irreconcilable with each other. In contrast, good data privacy and data utility might coexist when the privacy and utility are loosely coupled. Observe that for the uniform and Zipf distributions, a percentage of random matrices yields perturbed datasets having both good privacy and utility.

It can be seen that the choice of size of a stochastic random matrix and the distribution of the original data matrix X are important factors affecting the privacy-utility scatter area. A small permissible privacy-utility area entails an added computational cost. For example, for a total of 10,000 randomly generated matrices, for the normal distribution shown in the top graph in FIG. 10, only 15 matrices whose privacy-utility points fall within the given (0.1, 0.04) privacy-utility area ($\alpha \le 0.04$ and $\rho(M,X) \ge 0.1$), while no random matrix is found when the permissible area is set to be $\alpha \le 50.04$ and $\rho(M,X) \ge 0.15$. Therefore, in a practical setting, the permissible privacy utility area should be set accordingly.

A new paradigm of privacy-preserving data mining is now discussed, which is toward the opposite end of the global level privacy enforcement presented in Algorithm 1. This new paradigm is called a personalized privacy breach threshold ("PPBT"). It allows a data owner to specify a privacy threshold on the respective private data instead of the global-level privacy specification in Algorithm 1. By Definition 2, a privacy breach occurs if $P(x, \hat{x}, \epsilon)=0$ where $\epsilon$ is a PPBT value for private data x and $\hat{x}$ is an estimate of private data x.

To address the personalized privacy concerns, two variants of the PPBT method are considered, namely, a fixed PPBT and a variable PPBT. The fixed PPBT method uses one single privacy breach threshold for all individual data in the original data matrix X, while the variable PPBT method assumes the individual privacy breach threshold follows a certain distribution.

A second method designated Algorithm 2 (as set forth below in Table V) addresses the PPBT issue, where P is an array containing the PPBT values specified by the respective data owners, as well as unspecified entries being initialized as 0.

TABLE V

ALGORITHM 2: Perturbed dataset with personalized privacy enforcement

```
     input  : X (original dataset}}
     input  : α {α−trace-preservation}, P {personalized
                privacy breach threshold array}
     output: X̂ {Perturbed dataset}
1    begin
2        repeat
3            generate a matrix M_{m×n};
4            Y = MX              /* low-dimen sketch */;
5            X̂ = M⁺Y             /* distribution approx */;
6            t = |tr(X) − tr(X̂)|/|tr(X)|
             /* α−trace-preservation */;
7            f = 1, j = 0;
8            while j < n, do
9                v = |X[j] − X̂[j]/X[j]    /* get PPBT */;
10               if (v ≤ P[j]) then    /* check whether a
                 privacy breach occurs */
11                   f = 0;
12                   break        /* a breach of privacy
                     detected, out of loop */;
13               end
14               j=i+1;
15           end
```

TABLE V-continued

ALGORITHM 2: Perturbed dataset with personalized privacy enforcement

```
16           until t ≤ α and f ≠ 0);
17           return X̂
18       end
```

Line 9 of Algorithm 2 computes the actual PPBT value, and line 10 checks whether the obtained PPBT individual value is less than the specified PPBT. If the answer is YES, the method jumps out the loop break. Otherwise, the method continues checking the next one. To ensure strict compliance with all individual privacy thresholds, a breach of privacy during the loop results in a regeneration of stochastic matrix. Notice that Algorithm 2 is presented for brevity and clarity rather than for performance efficiency.

Figure 11:
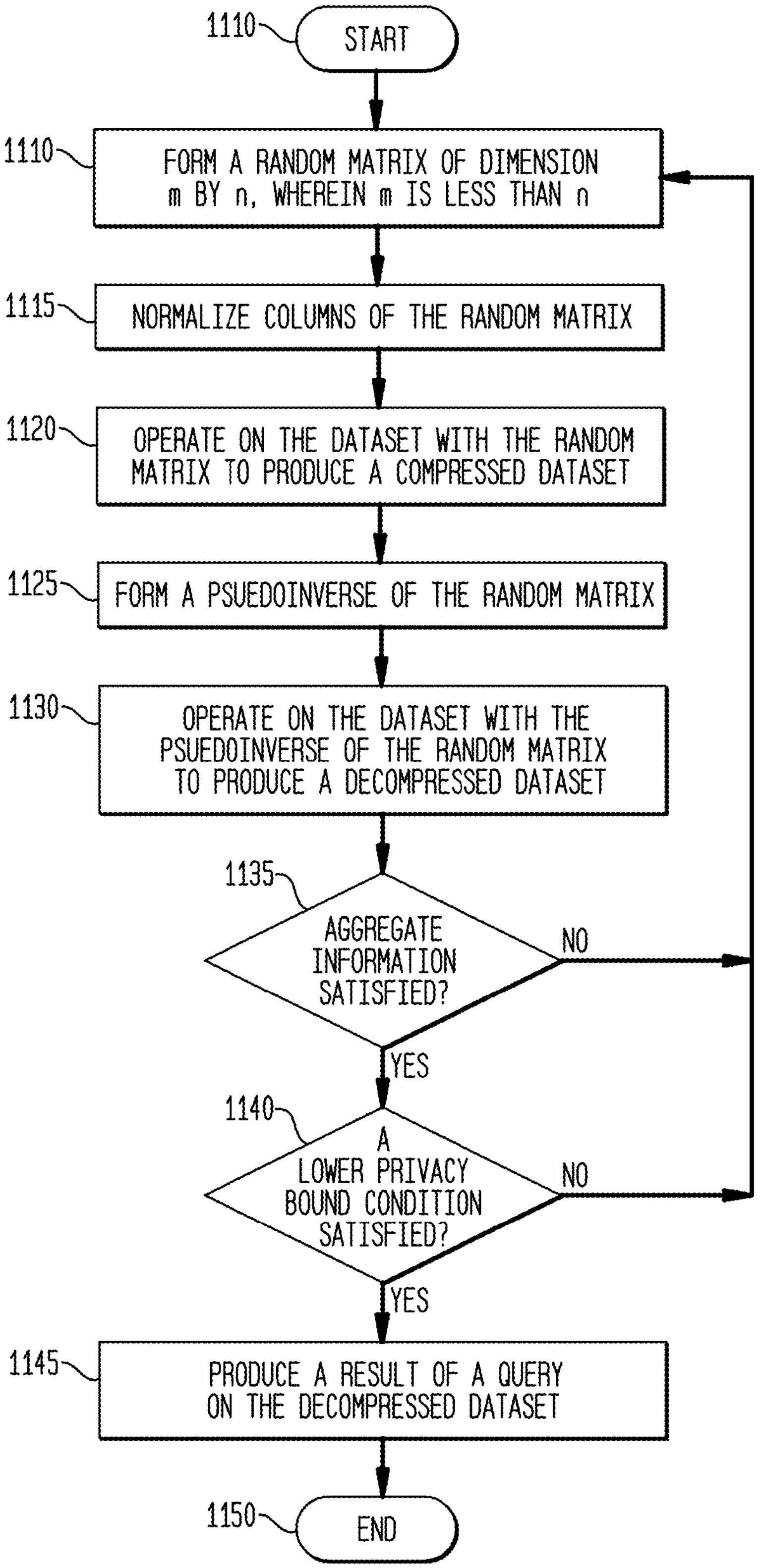
FIG. 11, illustrated is a flow diagram of an embodiment of a method of preserving privacy of data stored in a dataset in a database with a number n of entries.

Turning now to FIG. 11, illustrated is a flow diagram of an embodiment of a method of preserving privacy of data stored in a dataset in a database with a number n of entries. The method begins in a start step or module 1100. At a step or module 1110, a random matrix is formed of dimension m by n, wherein m is less than n. In an embodiment, the elements of the random matrix are formed with random numbers independently generated using a Gaussian probability density. In an embodiment, the random matrix is a contraction with a Euclidean norm less than unity, and all entries are non-negative. At a step or module 1115, the columns of the random matrix are normalized. At a step or module 1120, the dataset is operated on with the random matrix to produce a compressed dataset. At a step or module 1125, a pseudoinverse of the random matrix is formed. In an embodiment, the pseudoinverse is a Moore-Penrose pseudoinverse.

At a step or module 1130, the dataset is operated on with the pseudoinverse of the random matrix to produce a decompressed dataset. At a step or module 1135, if aggregated information of the decompressed dataset is not satisfied the method returns to step or module 1110 to form another random matrix. Otherwise, at step or module 1140, if a lower privacy bound condition for the decompressed dataset is not satisfied, the method returns to step or module 1110 to form another random matrix. Otherwise, in step or module 1145, the result of a query on the decompressed dataset is produced. In an embodiment, the dataset is publicly accessible over the Internet. The method ends at step or module 1150.

Scalability and local and global privacy enforcement are further topics as addressed herein. The scalability issue is the observation that computation of Moore-Penrose inverse is not a trivial task as it may involve a single value decomposition, which could be expensive and time-consuming for a large-size matrix. As a result, in a practical setting, computing the Moore-Penrose inverse of a large-size matrix could be problematic.

As seen from the relation:

$$1-\|\hat{X}\|_2/\|X\|_2 \le \|X-\hat{X}\|_2/\|X\|_2 \le \|I-M^{+}M\|_2,$$

both the lower privacy bound and α-trace preservation are global-level metrics, whereas the personalized privacy breach threshold is an individual privacy metric. A global-level metric may often not be applied consistently across different levels. Questions naturally arise such as how to handle a large dataset and how to apply the global-level privacy policy consistently across different levels (local and global levels).

A bottom-up privacy enhancement process is introduced for efficiently handling a large dataset and consistent application of privacy policy at local and global levels. Let the original data matrix X be an original dataset of size of kn. We partition the original data matrix X into k equal-size blocks $(X_1, \ldots, X_k)$. For each block $X_i$, a stochastic random matrix $M_i$ is identified such that a distribution approximation $\hat{X}_i = M_i^+ M_i X_i$ satisfies the privacy and utility requirements for each block. The distribution approximation $\hat{X}_i$ for block $X_i$ can be pieced together to form the distribution approximation for $\hat{X}$. The problem is thus formulated as below:

$$Y = \begin{bmatrix} Y_1 \\ \vdots \\ Y_K \end{bmatrix} = \begin{bmatrix} M_1 & 0_{m\times n} & \ldots & 0_{m\times n} \\ 0_{m\times n} & M_2 & 0_{m\times n} & \ldots \\ \ldots & \ldots & \ldots & \ldots \\ 0_{m\times n} & \ldots & 0_{m\times n} & M_k \end{bmatrix} X = \begin{bmatrix} M_1 X_1 \\ \vdots \\ M_k X_k \end{bmatrix},$$

where $M_i$, $1 \le i \le k$ is an m-by-n stochastic submatrix on the diagonal of the random matrix M, the compressed data matrix $Y_i$ is an m-by-1 matrix and the distribution approximation $X_4$ is an n-by-1 matrix.

Thus, the compression ratio is m/n.

$$\begin{bmatrix} \hat{X}_1 \\ \vdots \\ \hat{X}_k \end{bmatrix} = \begin{bmatrix} M_1^+ & 0_{n\times m} & \ldots & 0_{n\times m} \\ 0_{n\times m} & M_2^+ & 0_{n\times m} & \ldots \\ \ldots & \ldots & \ldots & \ldots \\ 0_{n\times m} & \ldots & 0_{n\times m} & M_k^+ \end{bmatrix} \begin{bmatrix} Y_1 \\ \vdots \\ Y_K \end{bmatrix} = \begin{bmatrix} M_1^+ X_1 \\ \vdots \\ M_k^+ X_k \end{bmatrix},$$

where $M_i^+$, $1 \le i \le k$ is an n-by-m submatrix on the diagonal of $M^+$ (the Moore-Penrose inverse of M), and the distribution approximation $\hat{X}_i$ is an n-by-1 matrix.

The efficient benefit of this dataset partitioning is quantitatively analyzed as set forth below. Suppose that the overhead for computing the distribution approximation $\hat{X}$ is $O(n^\alpha)$ for an m-by-n stochastic matrix of size $m \le n$. When partitioning the original data matrix X into k data blocks, the overhead of computing the distribution approximation becomes $$O\left(\frac{n^\alpha}{k^{\alpha-1}}\right).$$

Theorem 3: Let the original data matrix $X=(X_1, \ldots, X_k)^T$, and the distribution approximation $\hat{X}=(\hat{X}_1, \ldots, \hat{X}_k)^T$ where $$\hat{X}_i = M_i^+ M_i X_i.$$

Let $\beta_i$ be the prescribed privacy bound for block $X_i$, i.e., $\|bX i\|_2 \le \beta_i \|X_i\|_2$, $1 \le i \le k$. Then:

$$\|\hat{X}\|_2 \le \beta \|X\|_2 \text{ where } \beta = \max\{\beta_1, \ldots, \beta_k\}.$$

Theorem 3 implies that the privacy bound on a dataset is bounded by the maximum privacy bound on its data blocks.

Theorem 4: Let the original data matrix $X=(X_1, \ldots, X_k)^T$, and the distribution approximation $\hat{X}=(\hat{X}_1, \ldots, \hat{X}_k)^T$ where $\hat{X}_i = M^+ M_i X_i$. If $M_i^+ M_i$ is α-trace-preserving with respect to $X_i$ for $1 \le j \le k$, then $M^+M$ is α-trace preserving with respect to the original data matrix X. Theorem 4 asserts that the α-trace-preservation on the dataset is also bound by that on its constituent partition blocks. The two theorems show that the relationship between local and global privacy bounds when a partition scheme is employed. The theorems ensure that satisfying both the privacy and utility requirements on each constituent data block supports the privacy and utility compliance on the global level.

A perturbation model has been presented for providing a provably secure disclosure control over individual records while providing an accurate estimation of aggregate statistics. The new process comprises a low-dimensional sketch construction and a high-dimensional approximation. In the sketch construction, a random matrix M is used to uniformly compress an original data matrix X into a low-dimensional sketch Y=MX. The goal is to reduce the possibility of exact recovery, thereby ensuring a level of privacy protection. The goal of distribution approximation is to find a complex conjugate transpose $X^*$ of the original data matrix X such that $MX=MX^*$ and $\|X^*\|_2$ is minimal. This seeks best low-dimensional descriptions of high-dimensional data. The defining trait of the perturbation model is to exploit randomness in stochastic random matrices to reconcile two inherently contradictory privacy and data utility factors.

An advantage of the perturbation method is its retention of a database schema, which in turn preserves the database access environment. In contrast, the conventional disinformation strategies often use an interval to replace a single numeric number under a sensitive attribute. For example, the age of 45 will be replaced by the interval [20, 60] such a type mismatch requires a substantial schema change to accommodate a difference between the original and perturbation tables. This implies an enormous amount of time for testing and development.

In addition, the perturbation method supports personalized privacy breach control by allowing a data owner to specify a preferred privacy threshold. It was shown hereinabove that normalized privacy bound is equivalent to the square root of Rayleigh-Ritz quotient of I−MM. It was also shown how to generate a perturbed dataset that complies with specified privacy and utility conditions, including fixed and variable personalized privacy breach thresholds. The theoretical framework together with a comprehensive experimental study based on real-life datasets has been investigated.

Thus, an apparatus, system and method have been introduced for preserving privacy of data in a dataset in a database with a number n of entries. In one embodiment, the apparatus includes memory including computer program code configured to, with a processor, cause the apparatus to form a random matrix of dimension m by n, wherein m is less than n, normalize columns of the random matrix, operate on the dataset with the random matrix to produce a compressed dataset, form a pseudoinverse (e.g., a Moore-Penrose pseudoinverse) of the random matrix, and operate on the dataset with the pseudoinverse of the random matrix to produce a decompressed dataset.

The memory and the computer program code are also further configured to, with the processor, cause the apparatus to form another random matrix if aggregated information of the decompressed dataset is not satisfied, or if a lower privacy bound condition of the decompressed dataset is not satisfied. The memory and the computer program code are also further configured to, with the processor, cause the apparatus to produce a result of a query on the decompressed dataset. In one embodiment, the elements of the random matrix are formed with random numbers independently generated using a Gaussian probability density. In another embodiment, the random matrix is a contraction with a Euclidean norm less than unity, and all entries are non-negative. The dataset may be publicly accessible over the Internet.

For a better understanding of the general topic of privacy protection for databases, see the following references, which are incorporated herein by reference:

Charu C. Aggarwal, "A Survey of Randomization Methods for Privacy Preserving Data Mining, in Privacy Preserving Data Mining: Models and Algorithm," (Charu C. Aggarwal and Philip S. Yu, eds.), Springer, 2008, pp. 138-181, D. Agrawal and C. C. Agrawal, "On the Design and Quantification of Privacy-Privacy Data Mining Algorithms," Proceedings in the ACM SIGMOD Conference, 2002, R. Agrawal and R. Srikant, "Privacy-Preserving Data Mining," Proceedings in the ACM SIGMOD Conference, 2000, R. Agrawal, R. Srikant, and D. Thomas, "Privacy Preserving OLAP," Proceedings in the ACM SIGMOD Conference, 2005, R. J. Bayardo and R. Agrawal, "Data Privacy through Optimal k-Anonymization," ICDE Conference, 2005, Adi Ben-Israel and Thomas N. E. Greville, "Generalized Inverses: Theory and Applications," Springer-Verlag, 2003, L. Bhattacharya and L. Getoor, "Query-Time Entity Resolution," J. Artificial Intelligence Research 30 (2007), 621-657, C. Blake and C. Mertz, "UGI Respository of Machine Learning Databases," 1998, http://archive.ics.uci.edu/ml/datasets.html/, Yitao Duan, "P4P: A Practical Framework for Privacy Preserving Distributed Computation," Ph.D. thesis, UC Berkeley, 2007, G. T. Duncan and R. W. Pearson, "Enhancing Access to Microdata While Protecting Confidentiality: Prospects for the Future," Statistical Science 6 (1991), no. 3, 219-239, A. Friedman and A. Schuster, "Data Mining with Differential Privacy," ACM SIGKDD, 2010, D. C. Howe, H. Nissenbaum, and V. Toubiana, Trackmenot, 2011, http://cs.nyu.edu/trackmenot/, K. Liu, C. Giannella, and H. Kargupta, "An Attack's View of Distance Preserving Maps for Privacy Preserving Data Mining," Proceedings in the 10$^{th}$ European Conference on Principles and Practice of Knowledge Discovery in Databases, September 2006, A. Machanavajjhala, J. Gehrke, D. Kifer, and M. Venkitasubramaniam, "I-diversity: Privacy Beyond k-Anonymity," ICDE, 2006, Albert W. Marshall and Ingram Olkin, "Inequalities: Theory of Majorization and Its Applications," Academic Press, New York, 1979, A. Meyerson and R. Williams, "On the Complexity of Optimal k-Anonymity," ACM PODS Conference, 2004, R. Penrose, "A Generalized Inverse for Matrices," Proceedings of the Cambridge Philosophical Society 51 (1954), 406-413, R. Penrose and J. A. Todd, "On Best Approximate Solutions of linear Matrix Equations," Proceedings of the Cambridge Philosophical Society 52 (1956), 17-19, V. Rastogi, S. Hong, and D. Suciu, "The Boundary Between Privacy and Utility in Data Publishing," VLDB, 2007, pp. 531-542, Reputation Management Consultants, "Online Reputation Repair and Management," 2011, http://yvw.reputationmanagementconsultants.com/, P. Samarati and L. Sweeney, "Protecting Privacy When Disclosing Information: k-Anonymity and Its Enforcement through Generalization and Suppression," IEEE Symp. on Security and Privacy, 1998, L. Sweeney, "k-Anonymity: a Model for Protecting Privacy," International Journal on Uncertainty, Fuzziness and Knowledge-based Systems 10 (2002), No. 5, 557-570, Yufei Tao and Xiaokui Xiao, "Personalized Privacy Preservation," Privacy-Preserving Data Mining Models and Algorithm (Charu C. Aggarwal and Philip S. Yu, eds.), Springer, 2008, pp. 461-485, S. E. Whang and H. Garcia-Molina, "Managing Information Leakage," Fifth Biennial Conference on Innovative Data System Research (CIDR), 2011, Y. Zhu and L. Liu, "Optimal Randomization for Privacy Preserving Data Mining," ACM KDD Conference, 2004, Rob Hall and Stephen E. Fienberg, "Privacy-Preserving Record Linkage, Privacy in Statistical Databases," pp. 269-283, 2010, S. E. Fienberg and J. McIntyre, "Data Swapping: Variations on a Theme by Dalenius and Reiss," In Proceedings of Privacy in Statistical Databases, pp. 14-27, 2004, and G. T. Duncan and R. W. Pearson, "Enhancing Access to Microdata While Protecting Confidentiality: Prospects for the Future," Statistical Science, 6(3) pp. 219-232, 1991.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method of preserving privacy of data in a dataset in a database with a number n of entries, comprising:

forming a random matrix of dimension m by n, wherein m is less than n;

operating on said dataset with said random matrix to produce a compressed dataset;

forming a pseudoinverse of said random matrix; and operating on said dataset with said pseudoinverse of said random matrix to produce a decompressed dataset.

2. The method as recited in claim 1 further comprising normalizing columns of said random matrix.

3. The method as recited in claim 1 further comprising producing a result of a query on said decompressed dataset.

4. The method as recited in claim 1 wherein elements of said random matrix are formed with random numbers independently generated using a Gaussian probability density.

5. The method as recited in claim 1 wherein said pseudoinverse is a Moore-Penrose pseudoinverse.

6. The method as recited in claim 1 further comprising forming another random matrix if aggregated information of said decompressed dataset is not satisfied.

7. The method as recited in claim 1 further comprising forming another random matrix if a lower privacy bound condition of said decompressed dataset is not satisfied.

8. The method as recited in claim 1 wherein all entries in said random matrix are non-negative.

9. The method as recited in claim 1 wherein said random matrix is a contraction with a Euclidean norm less than unity.

10. The method as recited in claim 1 wherein said dataset is publicly accessible over an Internet.

11. An apparatus operable to preserve privacy of data in a dataset in a database with a number n of entries, comprising:

a processor; and memory including computer program code, said memory and said computer program code configured to, with said processor, cause said apparatus to perform at least the following:

form a random matrix of dimension m by n, wherein m is less than n, operate on said dataset with said random matrix to produce a compressed dataset, form a pseudoinverse of said random matrix, and operate on said dataset with said pseudoinverse of said random matrix to produce a decompressed dataset.

12. The apparatus as recited in claim 11 wherein said memory and said computer program code are further configured to, with said processor, cause said apparatus to normalize columns of said random matrix.

13. The apparatus as recited in claim 11 wherein said memory and said computer program code are further configured to, with said processor, cause said apparatus to produce a result of a query on said decompressed dataset.

14. The apparatus as recited in claim 11 wherein said memory and said computer program code are further configured to, with said processor, cause said apparatus to form another random matrix if aggregated information of said decompressed dataset is not satisfied.

15. The apparatus as recited in claim 11 wherein said memory and said computer program code are further configured to, with said processor, cause said apparatus to form another random matrix if a lower privacy bound condition of said decompressed dataset is not satisfied.

16. A computer program product that preserves privacy of data in a dataset in a database with a number n of entries, the computer program product comprising program code stored on a non-transitory computer readable medium configured to:

form a random matrix of dimension m by n, wherein m is less than n, operate on said dataset with said random matrix to produce a compressed dataset, form a pseudoinverse of said random matrix, and operate on said dataset with said pseudoinverse of said random matrix to produce a decompressed dataset.

17. The computer program product as recited in claim 16 wherein said program code stored on said non-transitory computer readable medium is further configured to normalize columns of said random matrix.

18. The computer program product as recited in claim 16 wherein said program code stored on said non-transitory computer readable medium is further configured to produce a result of a query on said decompressed dataset.

19. The computer program product as recited in claim 16 wherein said program code stored on said non-transitory computer readable medium is further configured to form another random matrix if aggregated information of said decompressed dataset is not satisfied.

20. The computer program product as recited in claim 16 wherein said program code stored on said non-transitory computer readable medium is further configured to form another random matrix if a lower privacy bound condition of said decompressed dataset is not satisfied.

* * * * *

UNITED STATES PATENT AND TRADEMARK OFFICE

CERTIFICATE OF CORRECTION

PATENT NO. : 9,043,250 B2
APPLICATION NO. : 13/738592
DATED : May 26, 2015
INVENTOR(S) : Ling et al.

It is certified that error appears in the above-identified patent and that said Letters Patent is hereby corrected as shown below:

ON THE TITLE PAGE

In the Figure, delete " 

" and insert -- 

--, therefor.

IN THE DRAWINGS

In Fig. 6, Sheet 6 of 12, for Tag "650", in Line 1, delete "$\alpha(X,M) > \beta$" and insert -- $\alpha(X,M) < \beta$ --, therefor.

In Fig. 11, sheet 12 of 12, delete " 

" and insert -- 

--, therefor.

IN THE SPECIFICATION

In Column 3, Line 42, delete "FIGUREs" and insert -- FIGURES --, therefor.

In Column 5, Line 64, delete "equipment 120" and insert -- equipment 110 --, therefor.

In Column 11, Line 42, delete "$X\text{-}(x_1, \ldots, x_n)$" and insert -- $X=(x_1, \ldots, x_n)$ --, therefor.

In Column 11, Line 56, delete "of')." and insert -- of'. --, therefor.

In Column 11, Line 63, delete " $i \sqsubset \{1, \ldots, n\}$ " and

Signed and Sealed this
Twenty-fourth Day of November, 2015

Michelle K. Lee
*Director of the United States Patent and Trademark Office* insert -- $i \square \{1, \ldots, n\}$ --, therefor.

In Column 11, Line 64, delete "to $\varepsilon_n$." and insert -- to εn. --, therefor.

In Column 12, Line 4, delete " $\cos(\theta)=\langle X, Y\rangle \|X\|_2\|Y\|_2$ " and insert -- $\cos(\theta)=\langle X, Y\rangle / \|X\|_2\|Y\|_2$ --, therefor.

In Column 12, Line 6, delete "θ(X, Y)=arccoss" and insert -- θ(X, Y)=across --, therefor.

In Column 12, Line 61, delete " $M \sqcap R^{m\times n}$ " and insert -- $M \square R^{m\times n}$ --, therefor.

In Column 14, Line 5, delete "condition}" and insert -- condition --, therefor.

In Column 14, Line 33, delete " $\|(MM^+Y-Y)\| \leq \|M(M^+Y)-Y\| = \|M\hat{X}-Y\|,$ " and insert -- $\|(MM^+Y-Y)\| \geq \|M(M^+Y)-Y\| = \|M\hat{X}-Y\|,$ --, therefor.

In Column 14, Line 48, delete "(I – M + M)X||" and insert -- $(I - M^+M)X\|$ --, therefor.

In Column 14, Line 62, delete " $\|X-\hat{X}_2,$ " and insert -- $\|X-\hat{X}\|_2,$ --, therefor.

In Column 14, Lines 66-67, delete " $\|X\|_2-\|\hat{X}\|_2 \leq X-\hat{X}\|_2=\|X-M^+MX\|_2=\langle X,(I-M+M) X)\rangle^{1/2} \leq \|I-M+M\|_2 \cdot \|X\|_2$ " and insert -- $\|X\|_2-\|\hat{X}\|_2 \leq \|X-\hat{X}\|_2=\|X-M^+MX\|_2=\langle X,(I-M^+M)X\rangle^{1/2} \leq \|I-M^+M\|_2 \cdot \|X\|_2$ --, therefor.

In Column 15, Line 20, delete " $\|\hat{X}\|2 \leq \|X\|_2.$ " and insert -- $\|\hat{X}\|_2 \leq \|X\|_2.$ --, therefor.

In Column 15, Lines 49-51, delete " $= \begin{bmatrix} 0 & 0 \\ 0 & I_{(n-r)\times((n-r)} \end{bmatrix}.$ " and insert -- $= \begin{bmatrix} 0 & 0 \\ 0 & I_{(n-r)\times(n-r)} \end{bmatrix}.$ --, therefor.

In Column 15, Line 57, delete "$\beta(M)-1$" and insert -- $\beta(M)=1$ --, therefor.

In Column 16, Line 22, delete "condition}" and insert -- condition --, therefor.

In Column 17, Line 20, delete "$\alpha\leq 50.04$" and insert -- $\alpha\leq 0.04$ --, therefor.

In Column 17, Line 49, delete "dataset}}" and insert -- dataset} --, therefor.

In Column 17, Line 59, delete "<n, do" and insert -- <n do --, therefor.

In Column 19, Line 25, delete "$X_4$" and insert -- $X_i$ --, therefor.

In Column 19, Line 41, delete "M)," and insert -- $M_i$), --, therefor.

In Column 19, Lines 60-61, delete "$||bXi||_2\leq\beta_i||X_i||_2$," and insert -- $||bX_i||_2\leq\beta_i||X_i||_2$, --, therefor.

In Column 20, Line 1, delete "$\hat{X}_i=M^+M_iX_i$." and insert -- $\hat{X}_i = M_i^+M_iX_i$. --, therefor.

In Column 20, Line 41, delete "I-MM." and insert -- $I-M^+M$. --, therefor.

In Column 21, Line 31, delete "Respository" and insert -- Repository --, therefor.

In Column 22, Line 9, delete "Mining" and insert -- Mining: --, therefor.